US011657174B2

(12) United States Patent
Levy et al.

(10) Patent No.: US 11,657,174 B2
(45) Date of Patent: *May 23, 2023

(54) DYNAMIC MULTI-FACTOR AUTHENTICATION

(71) Applicant: Sophos Limited, Abingdon (GB)

(72) Inventors: Joseph H. Levy, Farmington, UT (US); Andrew J. Thomas, Oxfordshire (GB); Daniel Salvatore Schiappa, Bedford, NH (US); Kenneth D. Ray, Seattle, WA (US)

(73) Assignee: Sophos Limited, Abingdon (GB)

( * ) Notice: Subject to any disclaimer, the term of this patent is extended or adjusted under 35 U.S.C. 154(b) by 41 days.

This patent is subject to a terminal disclaimer.

(21) Appl. No.: 17/356,902

(22) Filed: Jun. 24, 2021

(65) Prior Publication Data

US 2021/0326467 A1 Oct. 21, 2021

Related U.S. Application Data

(63) Continuation of application No. 16/383,421, filed on Apr. 12, 2019, now Pat. No. 11,068,615.

(Continued)

(51) Int. Cl.
*G06F 21/62* (2013.01)
*H04L 9/40* (2022.01)
(Continued)

(52) U.S. Cl.
CPC ........ *G06F 21/6218* (2013.01); *G06F 16/137* (2019.01); *G06F 16/285* (2019.01);
(Continued)

(58) Field of Classification Search
CPC .. G06F 21/6218; G06F 16/137; G06F 16/285; G06F 16/93; G06F 21/64;
(Continued)

(56) References Cited

U.S. PATENT DOCUMENTS 7,660,981 B1 2/2010 Hunt
8,769,676 B1 7/2014 Kashyap
(Continued)

FOREIGN PATENT DOCUMENTS

WO WO-2019157333 8/2019
WO WO-2019200317 10/2019

OTHER PUBLICATIONS

USPTO, "U.S. Appl. No. 16/383,421 Non-Final Office Action dated Jan. 4, 2021",, 25 pages.
(Continued)

*Primary Examiner* — Abiy Getachew
(74) *Attorney, Agent, or Firm* — Strategic Patents, P.C.

(57) ABSTRACT

An authentication model dynamically adjusts authentication factors required for access to a remote resource based on changes to a risk score for a user, a device, or some combination of these. For example, the authentication model may conditionally specify the number and type of authentication factors required by a user/device pair, and may dynamically alter authentication requirements based on changes to a current risk assessment for the user/device while the remote resource is in use.

20 Claims, 18 Drawing Sheets

Related U.S. Application Data

(60) Provisional application No. 62/657,542, filed on Apr. 13, 2018, provisional application No. 62/659,031, filed on Apr. 17, 2018, provisional application No. 62/744,956, filed on Oct. 12, 2018.

(51) Int. Cl.

| | |
|---|---|
| *G06N 20/00* | (2019.01) |
| *G06F 16/93* | (2019.01) |
| *G06F 16/28* | (2019.01) |
| *G06F 16/13* | (2019.01) |
| *G06F 21/64* | (2013.01) |
| *H04L 9/32* | (2006.01) |
| *H04L 41/00* | (2022.01) |
| *H04L 41/22* | (2022.01) |

(52) U.S. Cl.
CPC .............. *G06F 16/93* (2019.01); *G06F 21/64* (2013.01); *G06N 20/00* (2019.01); *H04L 9/3265* (2013.01); *H04L 41/20* (2013.01); *H04L 41/22* (2013.01); *H04L 63/08* (2013.01); *H04L 63/0838* (2013.01); *H04L 63/101* (2013.01); *H04L 63/102* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/20* (2013.01); *H04L 63/205* (2013.01)

(58) Field of Classification Search
CPC ...... G06F 21/45; G06N 20/00; G06N 3/0675; G06N 5/046; G06N 5/048; H04L 9/3265; H04L 41/20; H04L 41/22; H04L 63/08; H04L 63/0838; H04L 63/101; H04L 63/102; H04L 63/1408; H04L 63/1416; H04L 63/1425; H04L 63/1433; H04L 63/1441; H04L 63/20; H04L 63/205; H04L 63/0807; H04L 63/083; H04L 63/0861; H04L 9/3213; H04L 9/3228; H04L 9/3231; H04L 9/3271; H04L 2463/082; H04L 9/3226

See application file for complete search history.

(56) References Cited

U.S. PATENT DOCUMENTS

| | | |
|---|---|---|
| 10,147,065 B1 | 12/2018 | Yiftachel et al. |
| 2013/0191919 A1 | 7/2013 | Basavapatna et al. |
| 2014/0279641 A1 | 9/2014 | Singh et al. |
| 2015/0317325 A1 | 11/2015 | Key |
| 2015/0373043 A1 | 12/2015 | Wang et al. |
| 2016/0021117 A1* | 1/2016 | Harmon ................ H04L 63/08 726/1 |
| 2016/0125183 A1 | 5/2016 | Niemela |
| 2016/0173509 A1* | 6/2016 | Ray ..................... H04L 63/1425 726/23 |
| 2017/0046604 A1 | 2/2017 | Kaye et al. |
| 2017/0054729 A1 | 2/2017 | Ford |
| 2017/0134162 A1 | 5/2017 | Code et al. |
| 2017/0359220 A1 | 12/2017 | Weith et al. |
| 2018/0048668 A1 | 2/2018 | Gupta et al. |
| 2019/0319945 A1 | 10/2019 | Levy et al. |

OTHER PUBLICATIONS

USPTO, "U.S. Appl. No. 16/383,421 Notice of Allowance dated Mar. 25, 2021",, 8 pages.
WIPO, "Application No. PCT/US19/27320 International Preliminary Report on Patentability dated Oct. 22, 2020",, 17 pages.
ISA, "PCT Application No. PCT/US19/27320 International Search Report and Written Opinion dated Aug. 19, 2019",, 21 pages.
IPO, "UK Application No. 2017906.5 Search and Examination Report dated Jun. 20, 2022", 6 pages.
UKIPO, "UK Application No. 2302847.5 Search and Examination Report dated Mar. 17, 2023", 6 pages.

* cited by examiner

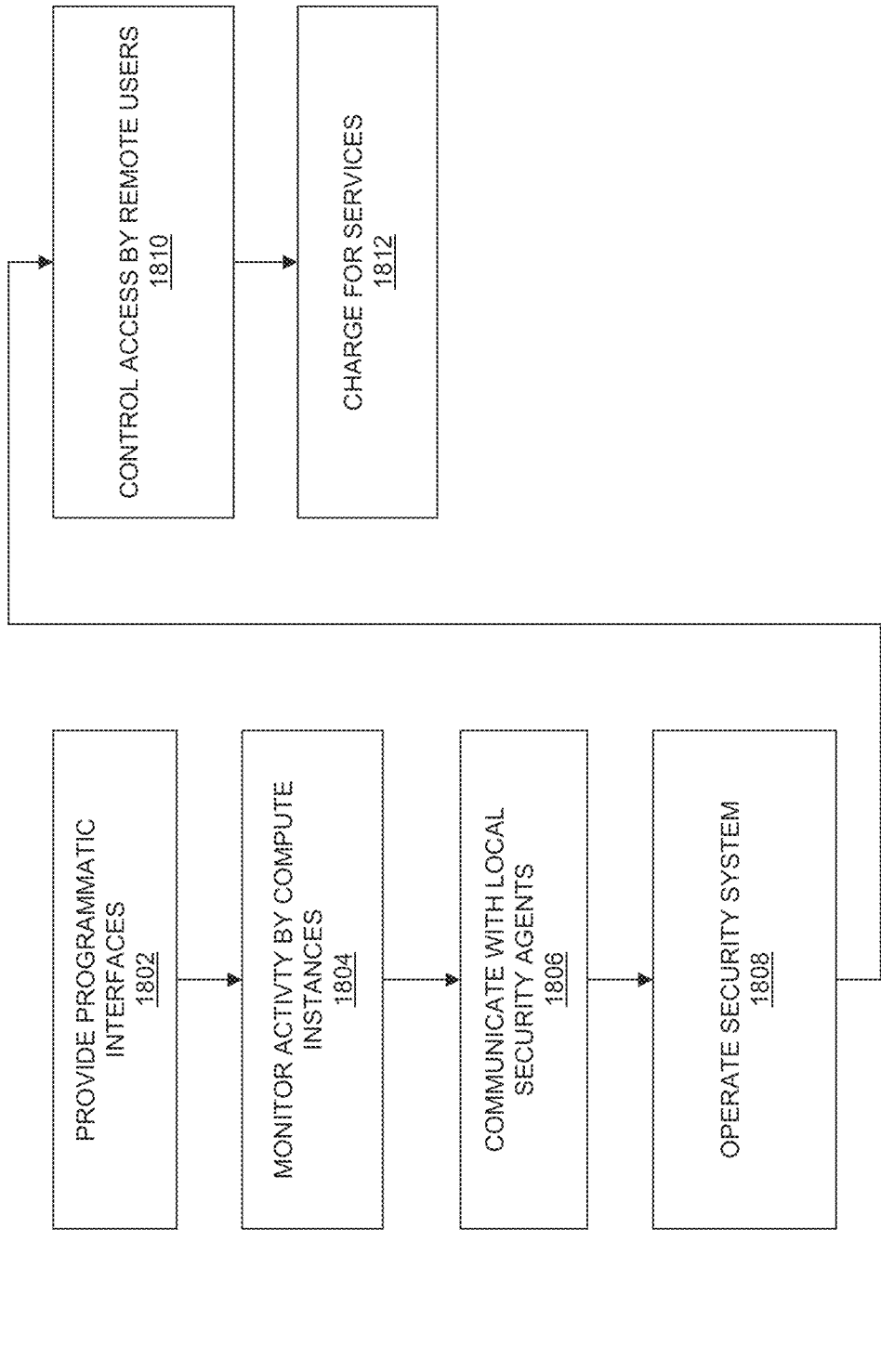

DYNAMIC MULTI-FACTOR AUTHENTICATION

CROSS-REFERENCE TO RELATED APPLICATIONS

This application is a continuation of U.S. patent application Ser. No. 16/383,421 filed on Apr. 12, 2019, which claims priority to U.S. Provisional Application No. 62/657,542 filed on Apr. 13, 2018, U.S. Provisional Application No. 62/659,031 filed on Apr. 17, 2018, and U.S. Provisional Application No. 62/744,956 filed on Oct. 12, 2018, where the entire contents of each of the foregoing are hereby incorporated by reference.

This application is related to U.S. patent application Ser. No. 16/165,274 filed on Oct. 19, 2018 and U.S. patent application Ser. No. 16/165,417 filed on Oct. 19, 2018, where the entire contents of each of the foregoing are hereby incorporated by reference. This application is also related to the following commonly-owned U.S. patent applications each filed on even date herewith and each incorporated herein by reference in its entirety: Ser. No. 16/383,315 entitled "Threat Response Using Event Vectors," Ser. No. 16/383,335 entitled "Centralized Event Detection," Ser. No. 16/383,407 entitled "Dynamic Policy Based On User Experience," and Ser. No. 16/383,439 entitled "Interface for Network Security Marketplace." This application is also related to the following commonly-owned international patent application filed on even date herewith and incorporated herein by reference in its entirety: PCT/US2019/027320 entitled "Network Security."

FIELD

The present disclosure generally relates to techniques for improving security in an enterprise network.

BACKGROUND

There remains a need for improved threat management systems.

SUMMARY

An authentication model dynamically adjusts authentication factors required for access to a remote resource based on changes to a risk score for a user, a device, or some combination of these. For example, the authentication model may conditionally specify the number and type of authentication factors required by a user/device pair, and may dynamically alter authentication requirements based on changes to a current risk assessment for the user/device while the remote resource is in use.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 18 shows a method for operating a network security marketplace.

DESCRIPTION

Figure 1:
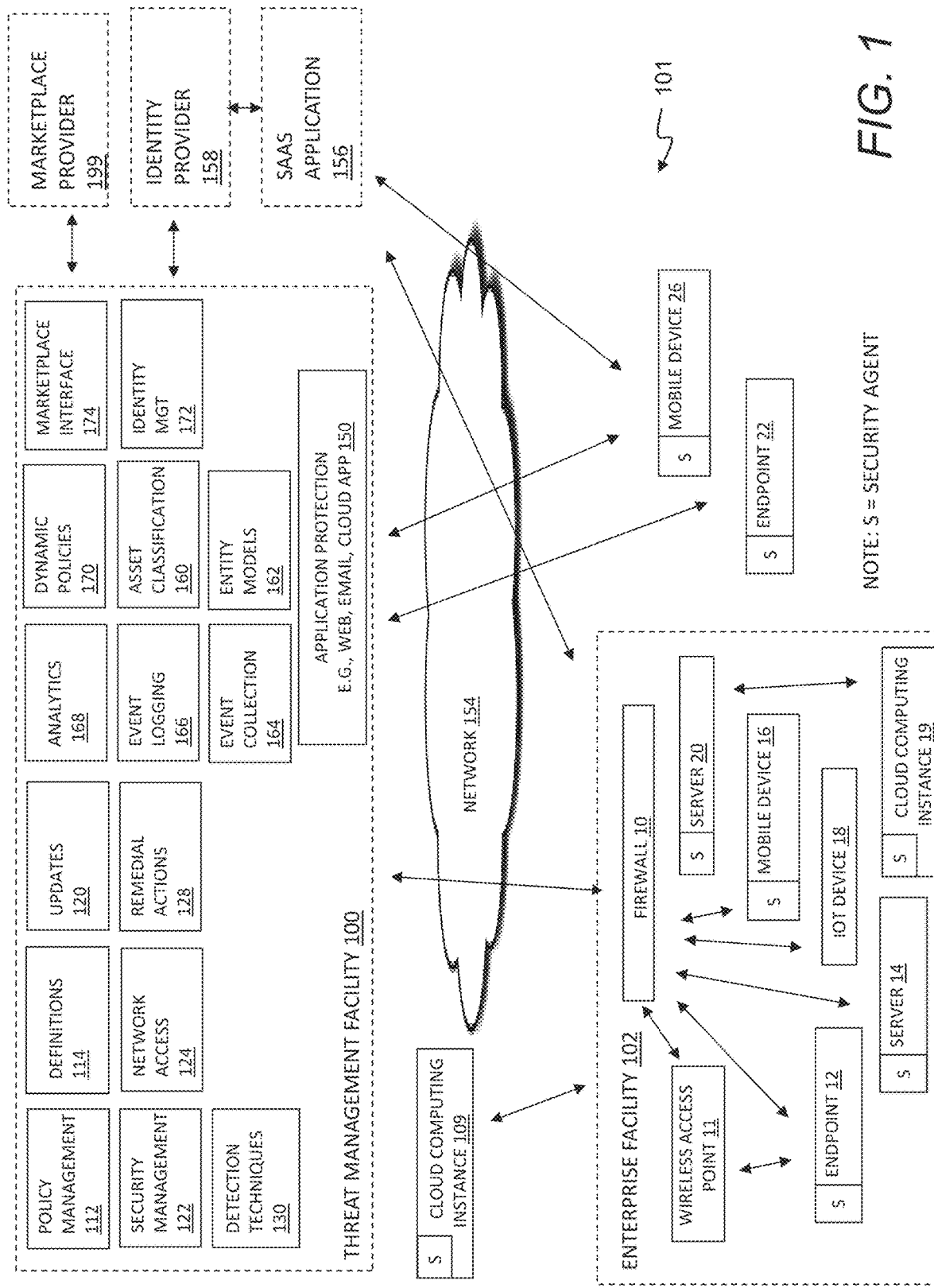
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. A marketplace provider 199 may be selected from a number of providers in a marketplace of providers that are available for integration or collaboration via the marketplace interface facility 174. A given marketplace provider 199 may use the marketplace interface facility 174 even if not engaged or enabled from or in a marketplace. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on.

The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility.

The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
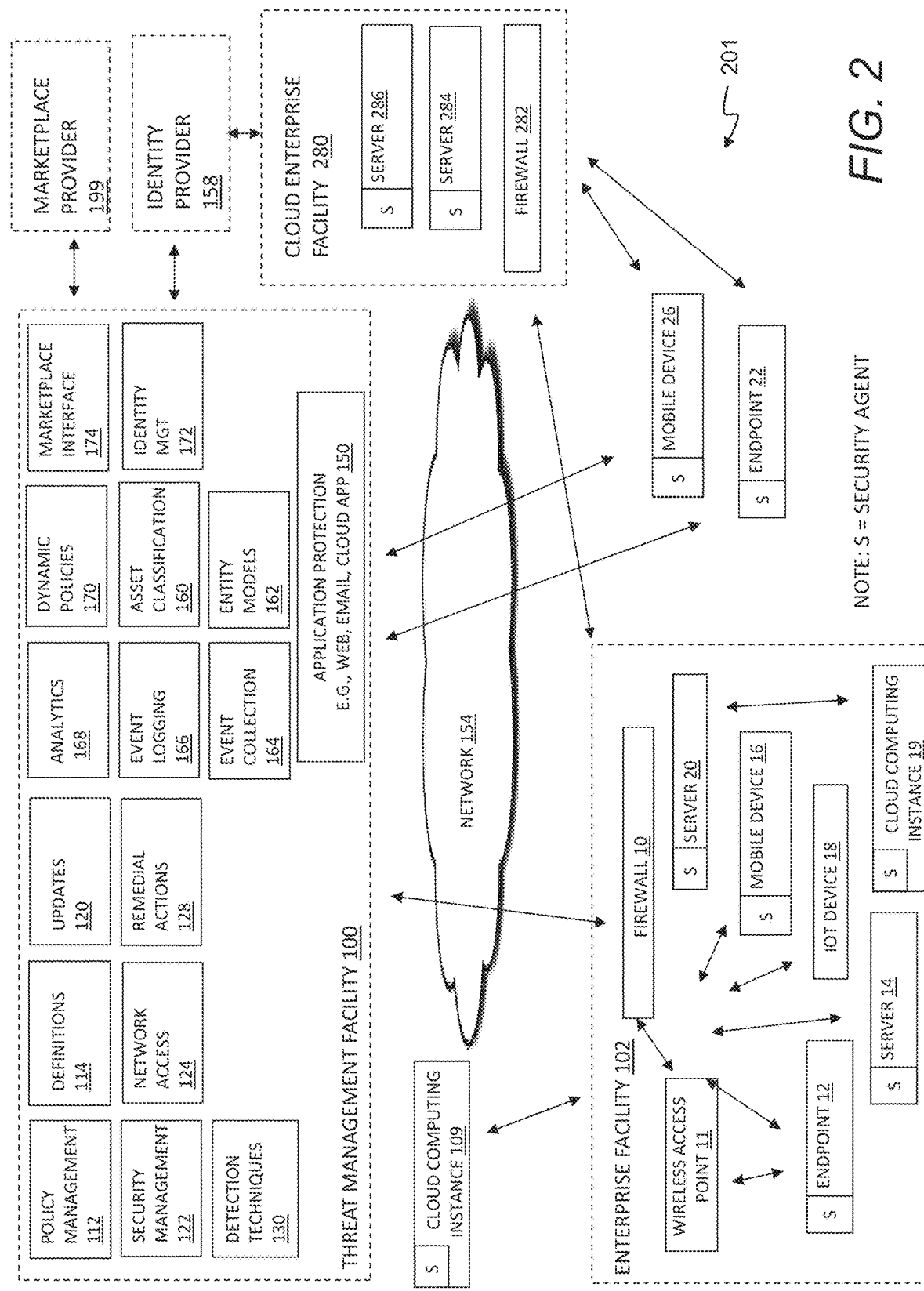
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
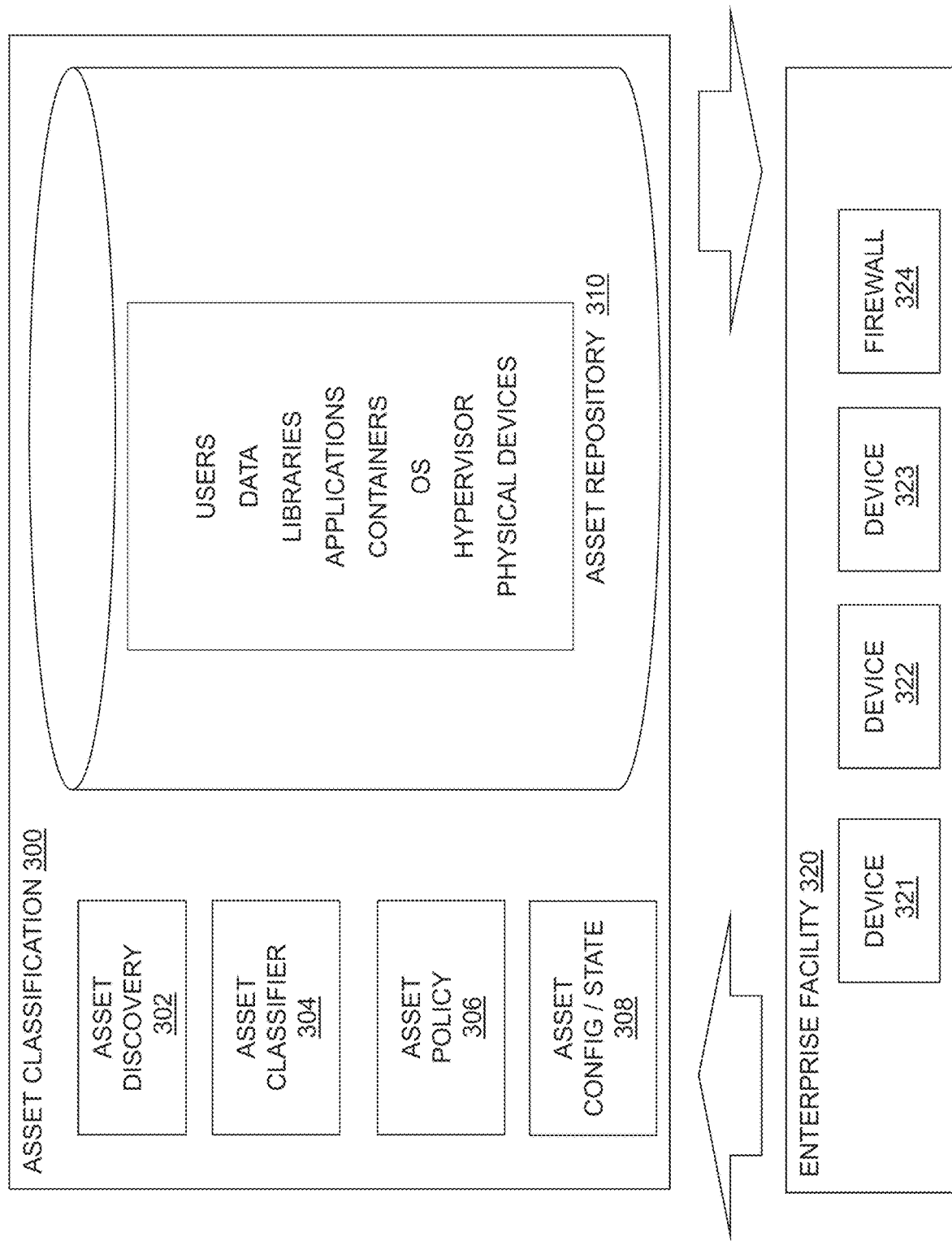
FIG. 3 depicts an asset classification facility and an enterprise facility.

Referring to FIG. 3, the asset classification facility 300 may discover, classify, and generate policies to evaluate the assets, also referred to herein as entities, based on entity models. The asset classification facility may also determine asset configuration and state. In implementations, each compute instance may include a stack of assets that may include, for example, the physical device, and if present, hypervisor, operating system, containers, applications, libraries, and data. This is a generalized representation of compute instances, including as a few examples, personal computers, servers in a data center, mobile devices, or cloud instances running in EC2. Not all compute instances will have all of these types of assets. Different compute instances may have different assets. In implementations, users authorized to access the compute instance also may be considered an asset of a compute instance.

Asset information may be stored in an asset repository 310. The asset repository may be a database, file, or other data store. The asset repository 310 may hold a large number of assets, and so it may be suitable to be stored in a cloud infrastructure. The asset repository 310 may be distributed, and some assets may be stored locally and some assets may be stored in a cloud data store. In embodiments, the asset repository may include records for all of the recognized assets of all of the recognized compute instances in the enterprise facility 320. As shown, the compute instances in the enterprise facility 320 may include a device 321, a device 322, a device 323, and a firewall 324. The compute instances 321-324 depicted are exemplary, and there may be any number or types of compute instances 321-324 in a given enterprise facility.

The asset discovery facility 302 may discover the assets in the enterprise facility 320. In embodiments, discovery may be active or passive. Asset discovery may be performed by security agents running on compute instances and interrogating available assets. In some cases, asset discovery may be performed using APIs, for example, where agents are not available on a compute instance. Passive observation may also or instead be used to discover assets. For example, observation of network communication may reveal information about an asset. A goal of asset discovery may be to identify and characterize the compute instances and other associated assets present in the enterprise facility environment.

An asset classifier 304 may classify each asset. Each asset may fall into a set of asset classes. Asset classes may be determined through a combination of the attributes and the activity as the compute instances operate in the enterprise facility. Non-limiting examples of assets (e.g., entities) or asset classes may include notebooks, servers, mobile devices, domain controllers, IoT devices, EC2 instances (running in cloud), etc., as well as the type, versions, and other features of the assets running on these assets. In one aspect, an asset may include a container, such as a Docker containers or any other container or the like, suitable for deploying executable code as a logical package that is virtualized, e.g., at the operating system level to provide a predictable execution environment that is isolated from other applications. Applications that are abstracted from a target environment for execution in this manner provide a light-weight and reusable format that can be deployed across many physical and virtual environments.

Asset policies may be determined based on the classification of each asset. For example, assets on compute instances with agents may be subject to certain policy restrictions, and assets on compute instances without agents may be subject to different policy restrictions. The policies available for each asset may be provided to the policy management facility.

The configuration and state of assets may be determined. Again, active interrogation may be used as well as passive observation. The configuration and state of the assets may be stored in the asset repository. Changes to the operating environment may be observed. Configurations may be measured against benchmarks to verify a strong security configuration.

Data may be classified using techniques such as natural language processing, to understand the meaning of the data is and, for example, whether it represents high, medium, or low business impact. This information may be stored in the asset database.

Once classified, entity models may be used to define events that may be collected from or involving the assets. The event models define asset-specific attributes that may be collected. For example, event models related to a particular mobile device may include the device itself, the operating system, the amount of storage, and so forth. The operating system may have attributes such as the build version or the libraries used. The overall entity model will determine what information may be collected from sensors on the device, such as accelerometer, or GPS/location information. As another example, a domain controller may have available events such as specific event IDs, such as new processes that are created or activity that is happening on the Kerberos ticket-granting system. These events would be defined by the entity model for the domain controller.

Entity models may be continuously updated so that they are current. Examples of attributes that may be considered are: volumes of data, URLs visited, IP session partners, the file shares accessed, the processes started, usage times, and locations.

It should be noted that there may be a lot of information collected about compute instances and users, and this has privacy implications and scalability implications. Privacy may be addressed in some cases by user notifications and permissions, anonymization, tokenization, and encryption. It may also be useful to optimize the data, coalesce the data, compress the data, and serialize the data. Security features may be used to avoid abuse of APIs (e.g., authentication, replay protection, DoS protection). Performance optimizations, such as rate limiting, prioritization, and queue management may be used to improve scalability.

Figure 4:
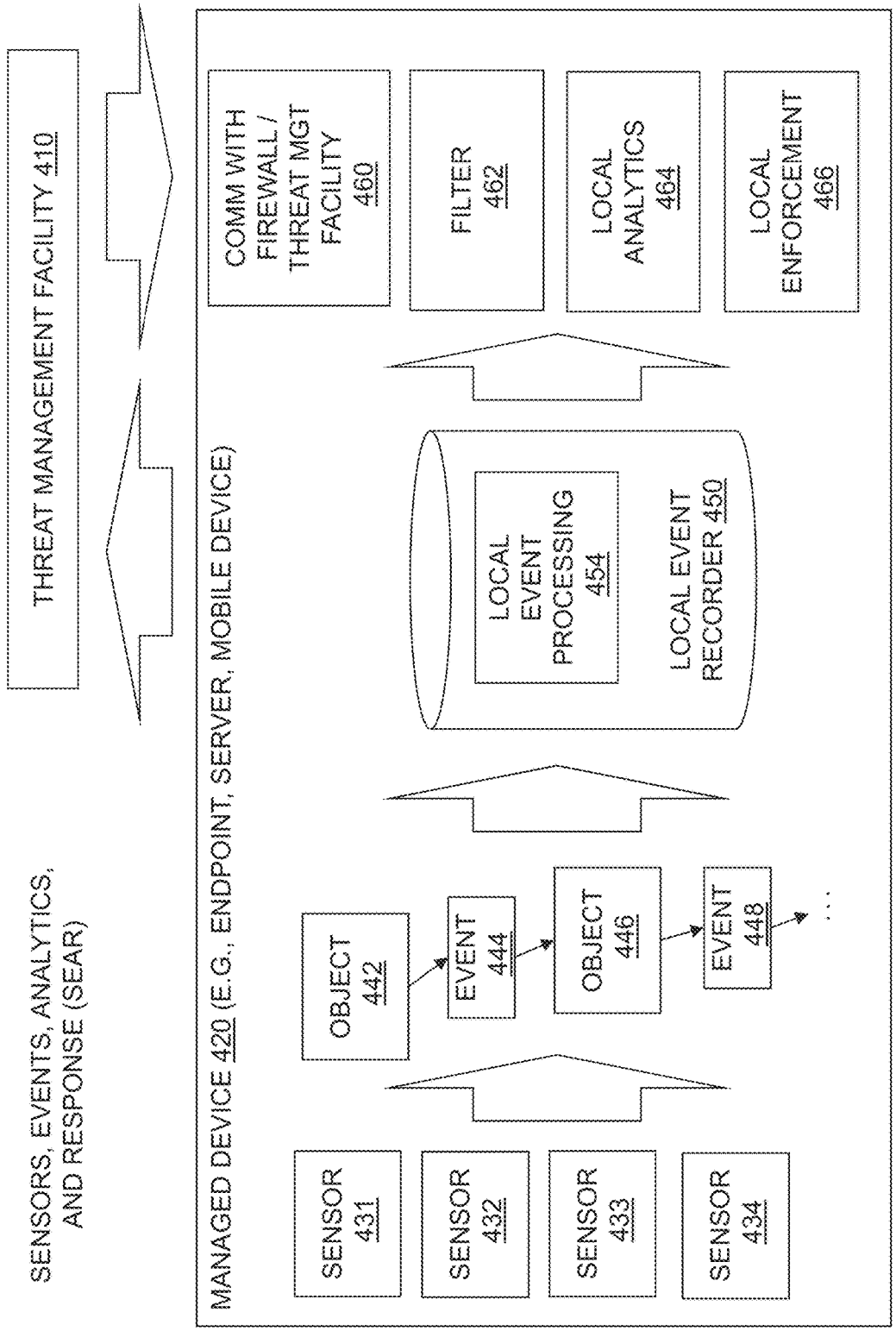
FIG. 4 depicts a sensors, events, enforcement, and response (SEER) environment.

Referring to FIG. 4, an exemplary system demonstrating Sensors, Events, Analytics, and Response (SEAR) may be used on a compute instance 420 such as a managed device. The compute instance 420 may include sensors 431, 432, 433, 434 that produce data that are recognized as events according to the entity model. The sensors 431, 432, 433, 434 thus are sources of event information. The output of sensors 431, 432, 433, 444 may be objects 442 that are recognized as events 444. There may be multiple objects 442, 446 and events 444, 448 provided by a sensor. The events may be processed by a local event processing facility 454. The event processing may perform tokenizing and processing. Some events may be recognized and evaluated in real-time, other events may be evaluated in the context of other events. This may be stream or bulk processing. Events may have attributes (e.g., mandatory, optional (e.g., best effort), sensitive (tokenize it in local event store), or associated contextual information.

A local event recorder 450 may be part of the event logging facility. Some recorded events may be stored locally and some may be communicated to another compute instance, such as the cloud. Some events will all be sent in real time, some only stored locally (and should be retrievable). An event filter 462 may be used to parse the events. Local analytics 464 on a compute instance may be used to locally identify events of interest. A communication facility 460 will communicate events to a central event store, such as a threat management facility 410, which may be a cloud facility. Local enforcement 466 may be used to take steps in response to events, as determined by the policy management facility 466. In embodiments, events can have attributes (e.g., mandatory, optional (e.g., best effort), sensitive (e.g., tokenize it in local event store). Some events will all be sent in real time, some only stored locally (and should be retrievable).

A goal is to discover as much as we can about the assets in the enterprise, and reduce surprises, such as compute instances that network administrators are not aware of, or unpatched compute instances, or valuable data leaving the enterprise.

As one non-limiting example, static policies may be assigned to access of files and data. Events involving files and data may be observed by sensors, for example, in a file system filter, generating events. The events may be determined to be of interest based on the policies.

Figure 5:
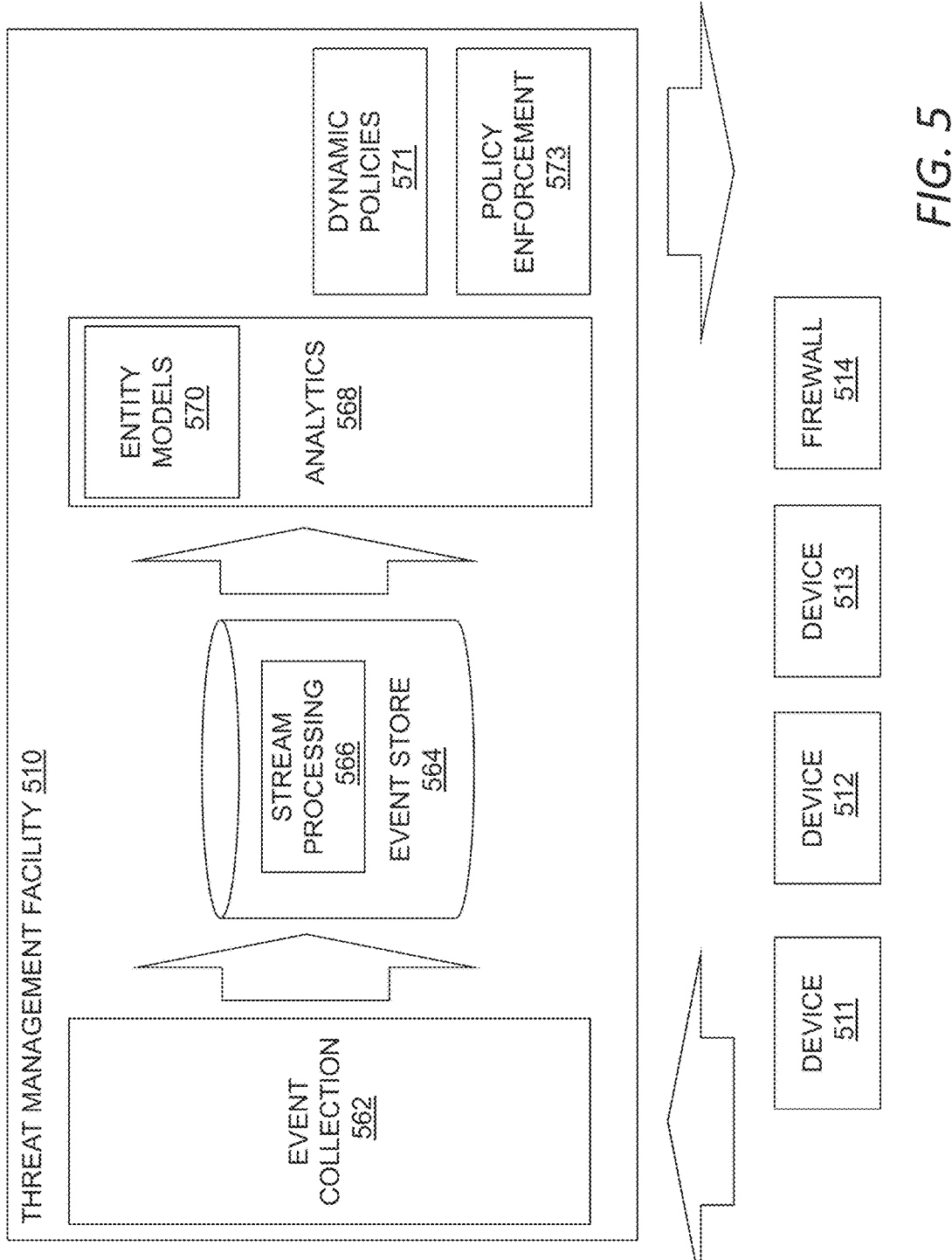
FIG. 5 depicts centralized event collection.

Referring to FIG. 5, centralized event collection 500 may be used to receive and store events from various compute instances. Events are received at a threat management facility 510 by event collection 562. Events may be received from compute instances, shown for the sake of clarity of illustration as a device 511, a device 512, a device 513, and a firewall 514, although events may be received from any number or type of compute instances. Events may be stored in the event store 564, and also may be processed in real-time by the stream processing facility 566. The entity models 570 may be used by the analytics facility 568 to make observations and inferences based on the events.

In embodiments, events are continuously analyzed against a baseline. The baseline may be adjusted to account for normal behavior. Comparison to baselines may include looking for outliers and anomalies as well as impossible events. For example, if a user logs on from Germany and then logs in from San Francisco, that may be considered impossible. Comparisons may be made at different levels. For example, the entity may be compared to itself e.g., does this user on Monday compare to past activity. For example, the entity may be compared to its peer group, e.g., is a finance department member behaving similar to others. For example, the entity may be compared to other entities within the enterprise. For example, the entity may be compared to other users at similar enterprises in the same industry, or in the same location, as well as to the universe of all users.

Real-time and retrospective threat intelligence may also be included, as well as vulnerability information and patch information.

With a sufficient level of confidence in the inferences, active, adaptive responses may be taken. For example, dynamic policies 571 may be updated to better fit the security profile to the environment that has been discovered and observed, e.g., by adjusting security settings within a security policy or group of security policies. A policy enforcement facility 573 may enforce these updated dynamic policies 571 at compute instances, such as the compute instances 511-514.

In embodiments, high-interaction interfaces allow an admin to interact with the event store 564 to better understand the assets in the enterprise facility and for specific purposes, such as threat hunting.

Figure 6:
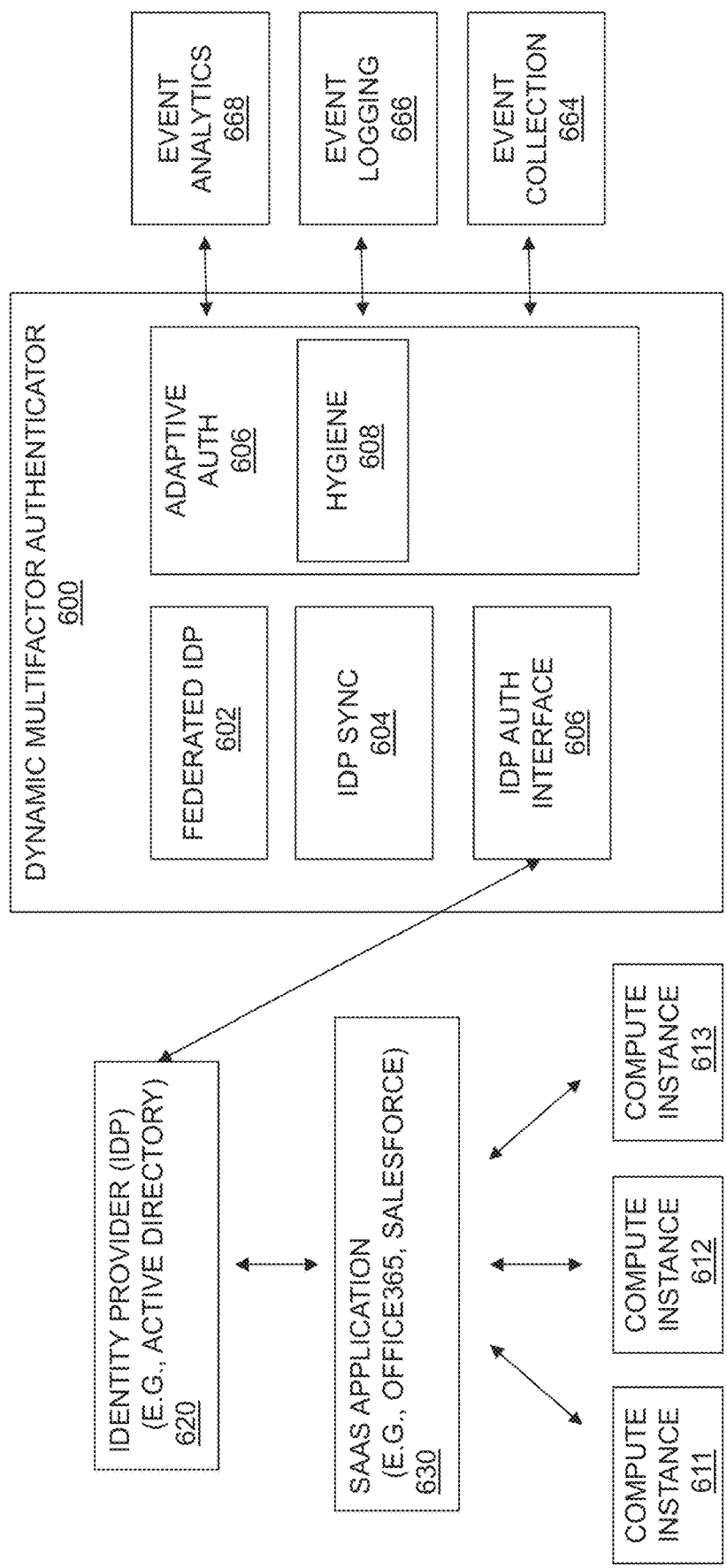
FIG. 6 depicts dynamic evaluation and authentication.

Referring to FIG. 6, a dynamic multifactor authenticator 600 may be used to dynamically evaluate the riskiness of a user, and provide authentication information that is based on the evaluation. As an example, the dynamic multifactor authenticator 600 may provide authentication information to or receive information from one or more of an event analytics facility 668, an event logging interface 666, or an event collection facility 664. In certain instances, the dynamic multifactor authenticator 600 may provide events to the event collection facility 664. Additionally, or alternatively, the event logging interface 666 may request events from the event logging facility 666, for example, to receive events from the event repository that may be used by the dynamic multifactor authenticator 600. The event logging interface 66 may, further or instead, receive observations or inferences from the event analytics facility 668, and pass those on to the dynamic multifactor authenticator 600. The event logging interface 666 may, further or instead, provide observations or inferences to the event analytics facility 668 based on observations or inferences made by the dynamic multifactor authenticator 600. Thus, the event logging interface 666 allows the dynamic multifactor authenticator 600 to participate in the event collection, logging, and analytics, for example, by logging additional events and/or interrogating the event repository.

Compute instances 611, 612, 613 may connect to a SaaS application 630. The SaaS applications 630 each communication with an identity provider 620 (e.g., Azure Active Directory). The identity provider 620 communicates with an identity provider interface 606, for example to provide multifactor authentication. For example, the IDP authentication interface 606 may send a text message or a notification to a mobile device that may be used as a requirement for authentication.

The dynamic multifactor authenticator 600 may include a federated IDP facility 602 to provide authentication services to relying party applications across a network. For example, the federated IDP facility 602 may offer user authentication as a service. Additionally, or alternatively, the dynamic multifactor authenticator 600 may include an IDP synchronization facility 604 to synchronize information for the authentication carried out by the dynamic multifactor authenticator 600.

In embodiments, the hygiene 608, or riskiness of the user may be used as part of an authentication decision. An adaptive authentication facility 606 may evaluate any or all of entity state, risk score, value of data, consistency of user against the model, for example, using the analytics of FIG. 5. The adaptive authentication facility 606 may receive attestations about the state of integrity, or the health state of the user that is logging on. This may include the health of the device that the user is logging in on, as well as the overall risk score that the user brings. In embodiments, the authentication may be revoked if the risk score changes.

Figure 7:
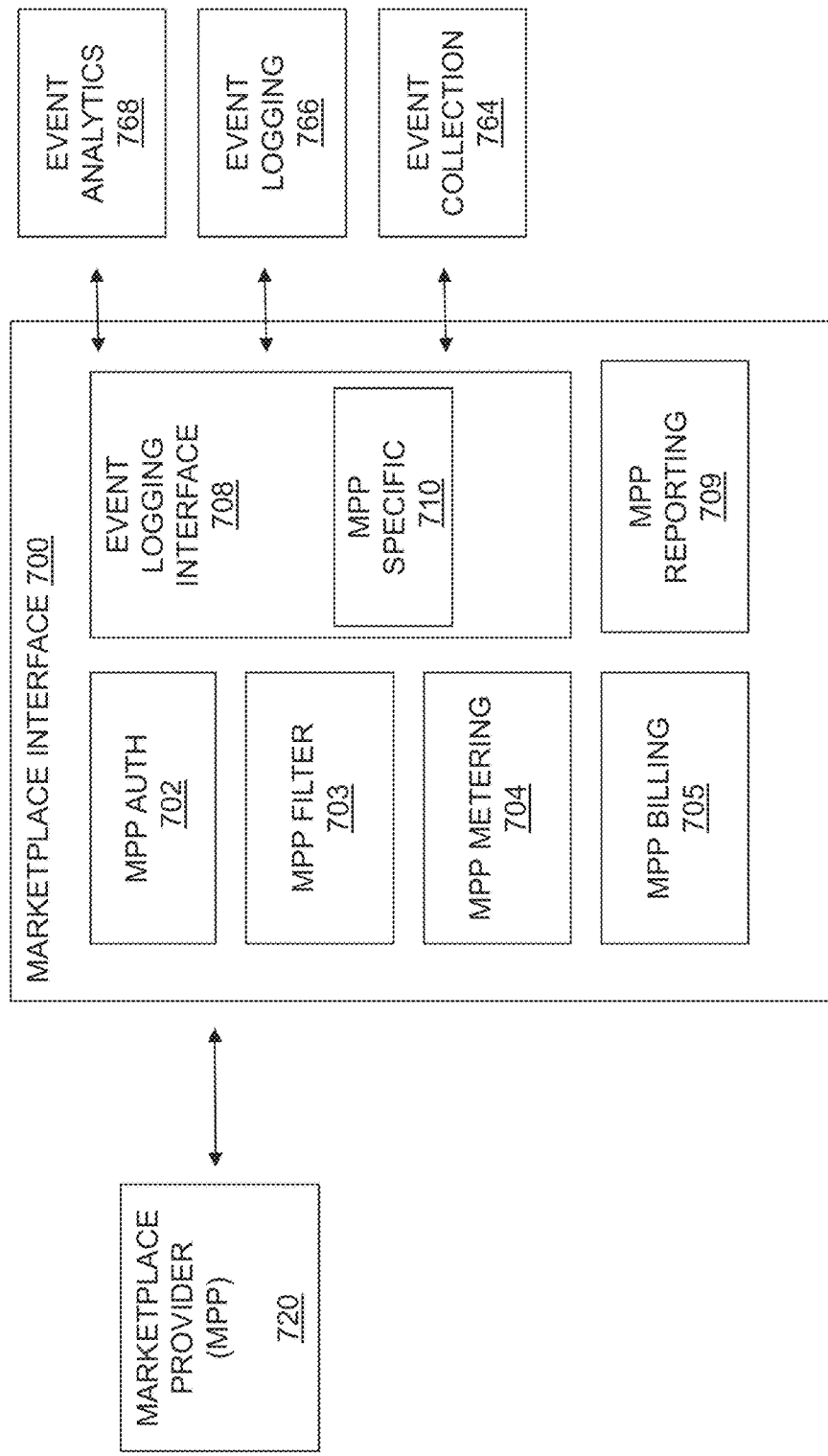
FIG. 7 depicts a marketplace interface facility.

Referring to FIG. 7, a marketplace interface facility 700 is provided to allow other vendors, referred to as marketplace providers (MPP) 720 to offer functionality to customers via the threat management facility. For example, a MPP 720 may be granted access to event data or analytics data for an enterprise facility, and the MPP 720 may use that data for additional analytics or reporting 709. For example, a MPP 720 may provide additional sensor data, event data, asset classes, event models, agents (e.g., code that runs on endpoints) or other data, which may be used by the MPP 720, another third-party service, or the threat management facility (e.g., the policy management facility or the security facility) generally.

In embodiments, a MPP 720 can provide information about an asset that is otherwise not known by the system's sensors. For example, a MPP may be the vendor of a cloud service, and the MPP may use the marketplace interface facility 700 to provide events that are specific to the cloud service. Just as one example, the MPP may be a human resources system provider, and the marketplace interface 700 may be used to provide information about a user from the human resources system, such as that they are leaving the company shortly or have left the company. The MPP 720 also may provide rules to the policy management system to use the fact that a user is leaving the company to increase the scrutiny used to monitor data loss prevention.

The marketplace interface facility 700 generally controls what a given MPP is authorized to access and provide, and, with appropriate authorization, allows the MPP to participate in enforcement. A marketplace provider authentication facility 702 allows a marketplace provider 720 to access the marketplace interface 700. This may include a multifactor authentication and/or the use of certificates and encryption. A MPP filter facility 703 controls what a MPP has access to, based on the privileges of the provider and permissions given by an enterprise. While a MPP 720 may be vetted and considered trustworthy, appropriate access to security information may be controlled.

A MPP metering facility 704 measures usage of MPP services by enterprise facilities. There may be a variety of different subscription and payments models for MPP services, and the metering facility 704 may be used to address them. In some implementations, the MPP 720 has a separate billing relationship with the enterprise facility, and the MPP 720 pays the threat management facility for access. In implementations, the enterprise facility is billed by the threat management facility for the MPP 720 services along with other threat management software subscriptions or services, and the threat management facility pays the MPP 720 for additional services subscribed to by the customer. In some cases, MPP 720 services may be charged based on usage. In some cases, MPP 720 services may be charged for unlimited usage for certain enterprises, with access to specific services determined for billing purposes. The MPP billing facility 705 may collect and communicate billing information to the customer and/or the MPP, for example, based on the business model and the MPP metering 704.

An event logging interface 708 interacts with the event collection facility 764, event logging facility 766, and/or event analytics facility 768. For example, the MPP logging interface 708 may provide events to the event collection facility 764. The event logging interface may request events from the event logging facility 766, for example, to receive events from the event repository that may be used by the MPP 720. The event logging interface may receive observations or inferences from the event analytics facility 768, and pass those on to the MPP 720. The event logging interface 708 may provide observations or inferences to the event analytics facility 768 based on observations or inferences made by the MPP 720. Thus, the Event logging interface 708 allows the MPP 720 to participate in the event collection, logging, and analytics, for example, by logging additional events and/or interrogating the event repository.

The event logging interface 708 may include MPP specific code or data 710 that may be used for event collection 764, event logging 766, or event analytics 768. In implementations, the MPP specific code or data may run or may be accessed by the threat management facility to provide MPP specific functionality, such as to generate new policies, determine violations of policies, determine observations or inferences, etc. By running MPP specific code or data 710 on the threat management system, the threat management system may be able to integrate the MPP 720 functionality.

Figure 8:
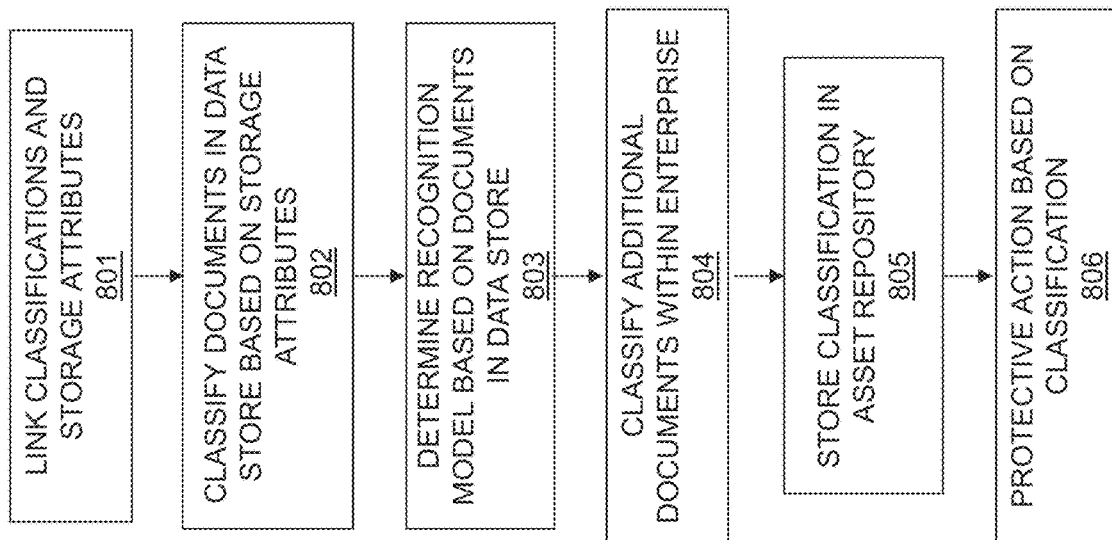
FIG. 8 depicts a flowchart of a method for data loss prevention.

Referring to FIG. 8, a method for data loss prevention may be used to classify data within an enterprise, and use those classifications for analytics and response. In general, storage attributes of data stored a data store may be used to determine a recognition model. The recognition model then may be used to classify other data within the enterprise. Thus, more easily classified data may be used to classify other data in the enterprise. In embodiments, the data may be stored in the form of documents.

In embodiments, classifications for documents may be specified. Classifications may include, for example, a department associated with the documents, such as sales, finance, legal, and development, or groups within a department. Classifications may include, for example, an importance or value of the data, from the perspective of preventing loss of the data. For example, classifications may include highly confidential/high value, moderately confidential, moderate value, and non-confidential/low value. Classifications may include any suitable classification for a document that will enable decisions based on the classification.

In embodiments, storage attributes of a data store may be specified. For example, an enterprise may have one or more data stores such as a file server, a document management system, or an intranet or central data store such as SharePoint. With reference to such data stores, storage attributes may include, for example, folder or directory names, document owners, groups with permissions to access, keywords assigned, and so on.

The classifications may be linked to storage attributes 801. For example, certain folders in a finance directory that are accessible only by the finance group may be classified as high value. Documents in folders in the finance directory that other departments are allowed to access may be classified as moderate value. Likewise, certain product management department documents with permissions assigned to a relatively small number of individuals may be considered high value. Other product management department documents with permissions assigned to a relatively large number of groups may be classified as low value. Classifications may be linked to storage attributes on a particular data store. For example, on a publicly accessible data store, all folders may be considered low value.

The documents in the data store may then be classified based on the linked classifications and storage attributes 802. For example, the data store may be scanned, and based on the storage attributes, a classification for documents may be determined.

A recognition model may be determined based on the documents in the data store 803. This may be accomplished in any suitable manner. In embodiments, attributes of documents are determined and stored in a feature vector. The feature vectors for documents in a classification may be clustered, and an average assigned to each cluster, thus generating a recognition model. In embodiments, signatures for portions of documents (e.g., using a sliding window) may be used as part of the feature vector. In embodiments, features such as entropy or complexity may be used as part of the feature vector. In embodiments, features of the documents, such as the type of document, the application(s)

supported by the document, the level of permissions or encryption, and other features may be included in a feature vector.

It should be understood that any suitable recognition model may be used. For example, a neural network or other model may be trained using machine learning using, which may use inputs as described above for feature vectors. For example, signatures and rules may be used to determine document matches.

The recognition model may be used to classify additional documents within the enterprise 804. For example, there may be documents for which the storage attributes were not determinative. For example, there may be documents on users' local computers or in personal storage areas of a central data store. For example, there may be documents that are in email servers or on USB drives or other external drives. For example, there may be documents on cloud servers. The recognition model may be used to classify documents, for example, in the case of a feature vector model, by determining a feature vector for a given document or portion of a document, and matching it (e.g., an exact match or within a threshold distance) to one of the feature vectors. The classification of the exact match or sufficiently similar document may be assigned to the unclassified document.

The classification for a document may be stored, for example, in the asset repository 805, such as that described above. The classification for a document may be used, for example, for context when evaluating an action taken on a document.

Based on the classification, a protective action may be taken 806. For example, access to documents of high value may be restricted for users or processes that are evaluated as a risky or suspicious. For example, transfer of low value documents to a USB drive may be permitted, but transfer of high value documents may require additional verification or permissions, or may be prevented. For example, email attachments of high value documents outside of the enterprise may be required to be encrypted.

In embodiments, a confidence level in the classification may be used as part of the determination of the action. For example, if a document is an exact match to a classified document, confidence in the classification may be high. For example, if a document is a somewhat similar but not very close match to a classified document, confidence in the classification may be lower. In embodiments, a user may be given more leeway on restrictions with a lower confidence level.

Figure 9:
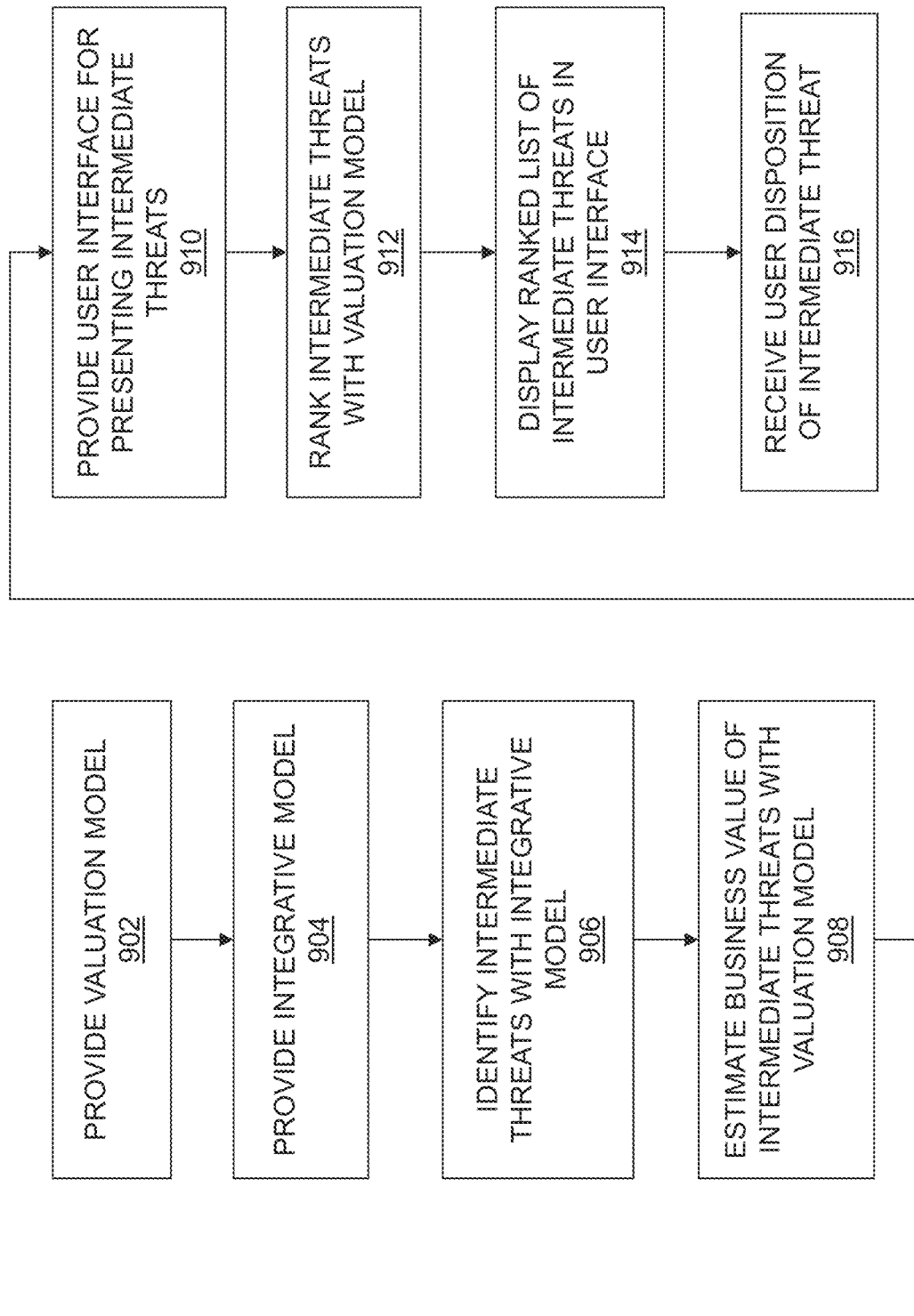
FIG. 9 shows a flowchart of a method for threat detection with business impact scoring.

FIG. 9 shows a flowchart of a method for threat detection with business impact scoring. In general, a computer model is created for automatically evaluating the business value of computing objects such as files and databases on an endpoint. This can be used to assess the potential business impact of a security compromise to an endpoint, or a process executing on an endpoint, in order to prioritize potential threats within an enterprise for human review and intervention. The business value may also or instead be used to train other models to recognize types of documents, to apply policies within an enterprise, or in any other manner consistent with the other techniques described herein.

As shown in step 902, the method 900 may include providing a valuation model for automatically estimating a business value of a file. Providing the valuation model may, for example, include training a machine learning algorithm to estimate the business value based on a training set of files each having a known business value. This may include training a machine learning model to recognize files with (known) high business value based on, e.g., ownership, authorship, content, access controls, and so forth. For example, the model may be trained to recognize credit card numbers, social security numbers, or other sensitive information including financial information, personal information, and other sensitive content within files indicative of actual or potential business value. The model may also or instead be trained to recognize potentially sensitive documents based on document type. For example, the model may be trained to classify documents as patent applications, resumes, financial statements, bank statements and so forth, with the corresponding classification used to assign an estimated value as appropriate.

This may also or instead include providing rules, regression models, heuristics, and so forth for identifying high business value files or otherwise estimating the value of files, data, content and the like. The valuation model may, for example, estimate value based on file location, based on an access control content, based on content, or based on any other context, usage, feature or combination of the foregoing. For example, the valuation model may estimate value based on one or more of encryption status, file type, file usage history, file creation date, file modification date, file content, and file author. More generally, this may include any human-interpretable features, or any other features useful for estimating business value, human-interpretable or otherwise, such as features independently identified by a clustering algorithm or other unsupervised machine learning technique.

These techniques may also or instead be used to estimate the business value of a machine or other domain based on the aggregated business value of files and the like within that estate. Thus while the description herein focuses on business value on a file-by-file basis, the method 900 contemplated herein may also or instead by used on a machine-by-machine basis or any other basis to estimate the business impact of potent threats.

As shown in step 904, the method 900 may include providing an integrative model, such as any of the integrative models described herein. For example, this may include creating an integrative model that evaluates a potential threat by a threat sample based on a combination of a first model configured to identify malicious code based on behavioral tags, a second model configured to identify malicious code based on an executable file path, and a third model configured to identify malicious code based on a Uniform Resource Locator within the threat sample. More generally, the integrative model may evaluate potential threats by computer objects based on one or more of file behavior, file signature, file path, Uniform Resource Locators accessed, or any other feature or combination of features suitable for assessing suspiciousness. The integrative model may also or instead include one or more machine learning models trained to recognize potentially malicious code based on a training set of known safe and known unsafe threat samples.

As shown in step 906, the method 900 may include identifying intermediate threats, e.g., with the integrative model. The one or more intermediate threats may include one or more computing objects with an objective score from the integrative model that are not within a predetermined confidence level of a safe score or a malicious score. The one or more computing objects may, for example, include a process, an executable, a file, and so forth. The one or more computing objects may also or instead include a registry of system settings, a secure kernel cache of process information, or any other data source, cache, resource or the like that might be usefully monitored for threat detection as contemplated herein.

Identifying intermediate threats may, for example, include configuring a threat management facility to evaluate new threat samples on endpoints within an enterprise network according to the integrative model based on, e.g., a filtered event stream as described herein, or any other technique or combination of techniques suitable for identifying code or other threat samples that cannot confidently be classified as safe or unsafe. Identifying intermediate threats may include evaluating new threat samples, such as by identifying one or more intermediate threats by any of the new threat samples that are not within a predetermined confidence level of safe code or malicious code according to the integrative model. It will be appreciated that, while an integrative model as contemplated herein is one useful model for identifying code that is not clearly safe or unsafe, other techniques for identifying intermediate threats may also or instead be used.

As shown in step 908, the method 900 may include estimating a business value of one or more intermediate threats with the valuation model described above. This may include generating an estimated dollar value of the contents of files accessed by a process or other computing object, or an estimated business impact of the public dissemination of information contained in such files. This may also or instead include generating a score otherwise indicative of business value based on any of the factors or features described herein.

As shown in step 910, the method 900 may include providing a user interface for presenting the one or more intermediate threats to a user for human evaluation. This may, for example, include any of the user interfaces described herein.

As shown in step 912, the method 900 may include ranking the one or more intermediate threats for presentation within the user interface, e.g., by ranking the intermediate threats with the valuation model described above. More generally, the intermediate threats may be ranked using any technique that reflects actual or potential business impact of the threat based on business value of affected data or compute instances, the likelihood or severity of the potential risk, or some combination of these. Thus in one aspect, ranking the intermediate threats may include ranking the intermediate threats based on a combination of a likelihood of maliciousness determined according to the integrative model and an estimated business value of associated files determined according to the valuation model.

As shown in step 914, the method 900 may include presenting a list of the one or more intermediate threats in the user interface. As discussed above, the list may be ranked according to a combination of an objective score of riskiness or suspiciousness (e.g., from the integrative model) and an objective score for the business value (e.g., from the valuation model).

As shown in step 916, the method 900 may include receiving a user disposition of an intermediate threat, for example using any of the techniques described herein. For example, this may include receiving a user-initiated remedial action for one of the intermediate threats in the user interface. This may also or instead include receiving a user risk assessment for one of the intermediate threats in the user interface, such as by explicitly categorizing the intermediate threat as safe, unsafe, unknown, or appropriate for increased monitoring. In another aspect, the method 900 may include remediating a risk to a high business value computing object in response to a user input in the user interface.

According to the foregoing, there is disclosed herein a system including a memory storing an integrative model and a valuation model, a threat management facility, and a web server. The integrative model may be configured to evaluate a potential threat by a threat sample based on a combination of a first model configured to identify malicious code based on behavioral tags, a second model configured to identify malicious code based on an executable file path, and a third model configured to identify malicious code based on a Uniform Resource Locator within the threat sample, and the valuation model configured to estimate a business impact of the potential threat based on an estimated business value of one or more files associated with the threat sample. The threat management facility may be configured to apply the integrative model to new threat samples and to identify intermediate threats that are not within a predetermined likelihood of being safe or unsafe. The web server may be configured to display a list of intermediate threats in a user interface, wherein the list of intermediate threats is ranked according to a combination of a first score from the integrative model and a second score from the valuation model. In one aspect, the threat management facility may be configured to remediate a risk to an endpoint in response to a user input received through the user interface.

Figure 10:
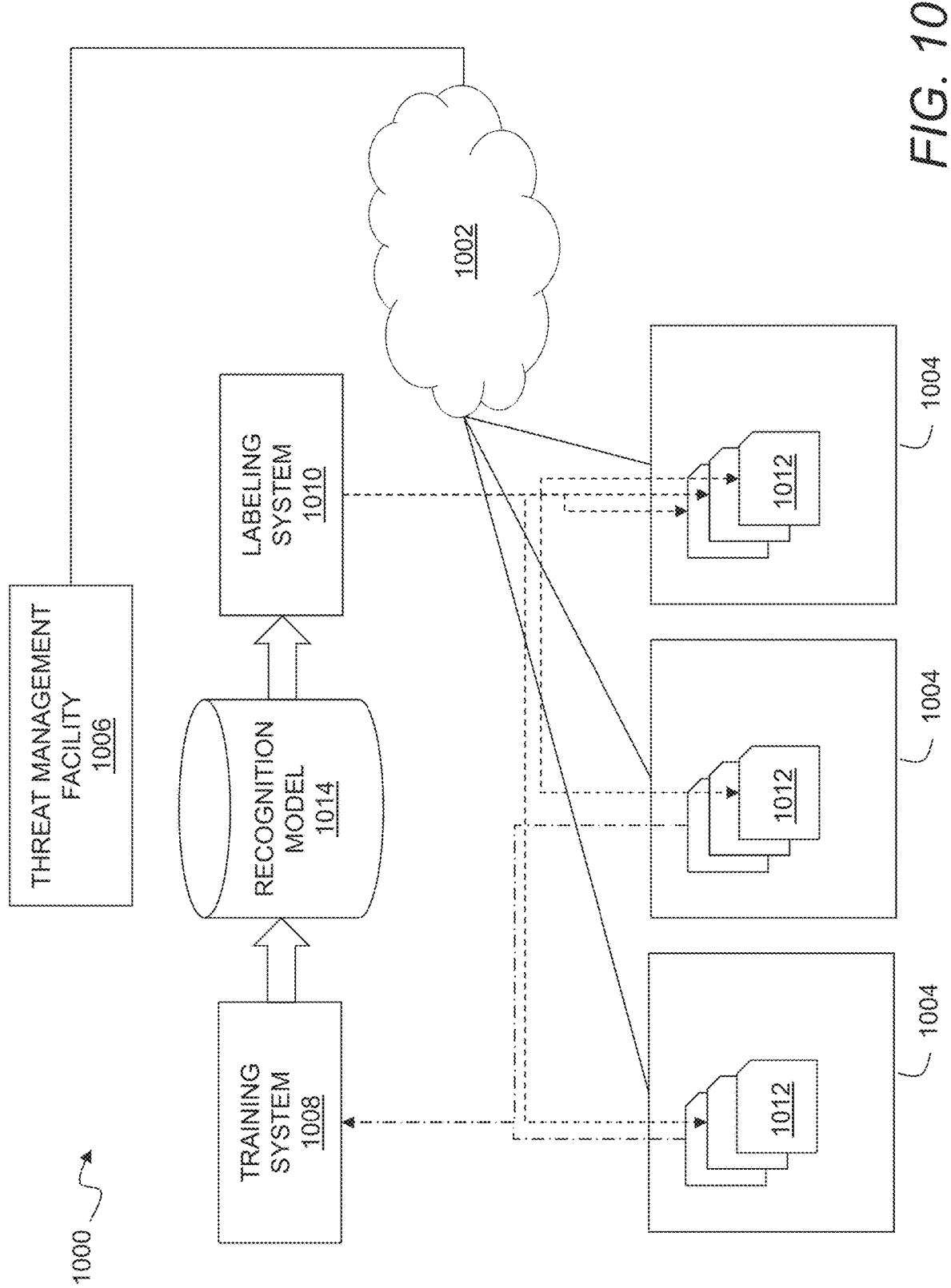
FIG. 10 shows a block diagram of a system for enterprise document classification.

FIG. 10 shows a system for enterprise document classification. In general, a collection of documents or other files and the like within an enterprise network may be labelled according to an enterprise document classification scheme using, e.g., any of the feature vectors, classification schemes, valuation techniques or the like described herein. Using this information, a recognition model such as a neural network or other suitable recognition model described herein can be used to automatically label other files throughout the enterprise network. In this manner, documents and the like throughout an enterprise can be automatically identified and managed according to features such as confidentiality, sensitivity, security risk, business value, and so forth.

As shown in FIG. 10, the system 1000 may generally include an enterprise network 1002 interconnecting a plurality of endpoints 1004, a threat management facility 1006, a training system 1008, and a labeling system 1010.

The enterprise network 1002 and the endpoints 1004 may be any of the networks and endpoints described herein. In general, each endpoint 1004 may store a number of documents or other files. For example, this may include documents such as word processing files, spreadsheets, HTML documents, images, audio files, video files, and so forth. This may also or instead include computer code such as source code, scripts, executable code, byte code and so forth. More generally, this may include any files suitable for classification and other processing as contemplated herein.

The threat management facility 1006 may be any of the threat management systems or the like described herein. The threat management facility 1006 may coordinate operation of the training system 1008 and the labeling system 1010, and may perform related functions such as storing the recognition model 1014. The threat management facility 1006 may also be configured to apply enterprise policies throughout the enterprise network 1002 based on the resulting, labeled documents along with any other information or context relevant to policy administration and enforcement, such as by applying an enterprise policy to each of the files 1012 based on a category identified in a label selected for each such file 1012 by the labeling system 1010.

In general, the training system 1008 may be configured to train the recognition model 1014 based on a manual or automatic selection of some of the files 1012 distributed throughout the enterprise. For example, the training system 1008 may be configured to receive a user selection of a plurality of files 1012 stored in the enterprise network 1002, to automatically or manually label each of the plurality of files according to a category selected from two or more predetermined categories, thereby providing a labeled data set, and to train the recognition model 1014, e.g., with machine learning or any other suitable techniques, to identify the category for a new file based on the plurality of files in the labeled data set.

The labeling system 1010 may apply the recognition model 1014 created by the training system 1008 to label other files throughout the enterprise network 1002. For example, the labeling system may be configured to locate other files 1012 in the enterprise network 1002 different than the plurality of files 1012, and to associate a label with each of the other files 1012 based upon the category selected by the recognition model for each of the other files 1012 from the two or more predetermined categories. The labels and categories may, for example, include any of the labels, categories, or other classification groups or schemes described herein.

Figure 11:
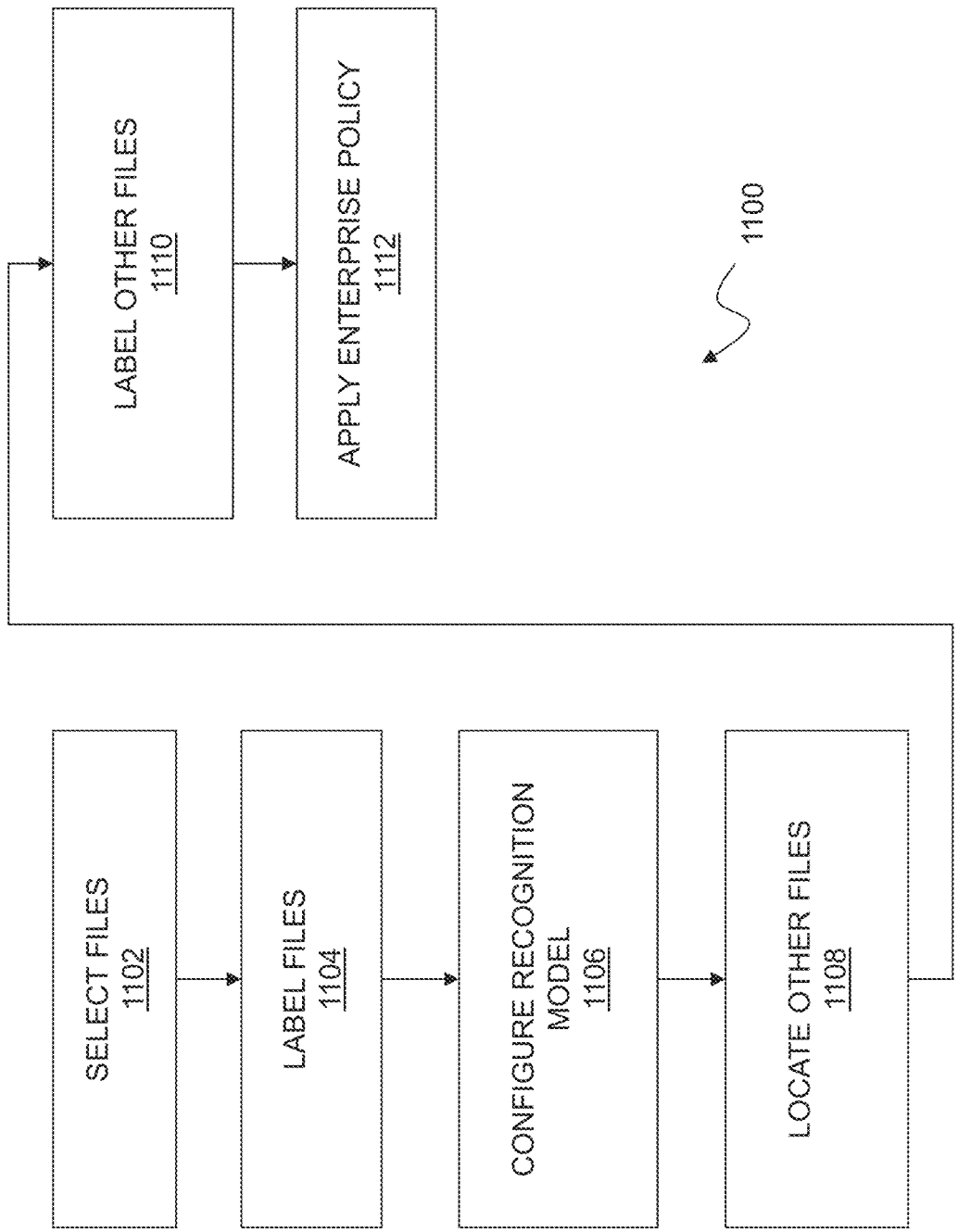
FIG. 11 shows a flowchart of a method for enterprise document classification.

FIG. 11 shows a flowchart of a method for enterprise document classification. In general, a system such as the system described above may be used to train a recognition model, and then apply the recognition model to label documents or other files throughout an enterprise network. An enterprise policy may then be applied based on (among other things), the label for each file.

As shown in step 1102, the method 1100 may begin with selecting files such as a plurality of documents stored within the enterprise network. More generally, the files may include one or more documents such as spreadsheets, word processing documents, presentations, or any of the other documents described herein. The files may also or instead include executables, source code, and other computer program code and the like. In another aspect, the files may include content such as electronic communications, electronic forms or other data that may be stored in a central repository such as a server, distributed among endpoints within the enterprise network, or some combination of these. Selecting may, for example, include automatically or manually selecting a representative group of files in a known directory, or owned by one or more users with known roles in the enterprise. In another aspect, this may include randomly selecting a number of files throughout the enterprise network.

As shown in step 1104, the method 1100 may include labeling the files. This may generally include manually labeling the files or automatically labeling the files. For example this may include explicitly labeling the selected files with a manual labeling process or an automatic or semi-automatic rule-based process or the like. Labeling may include labeling each of the plurality of files automatically (or manually) based on a file location. Labeling may also or instead include automatically (or manually) labeling each of the plurality of files with an organization role associated with a folder where the file is located, or an organization role of one or more users associated with the file. Labeling may also or instead include labeling each of the files based on permissions in a corresponding access control list.

For example, if a folder or a user is associated with a particular organization of an enterprise such as finance, legal, engineering and so forth, associated files may automatically be labeled accordingly. Thus in one aspect, labeling files may include automatically labeling each of a plurality of documents with a category for sensitivity according to a location, an access control list, and content of each of the plurality of documents, thereby providing a labeled data set for use by the recognition model. In another aspect, a machine learning engine or the like may be used to identify potentially misplaced or unrelated files based on, e.g., content, file type, ownership, etc. For example, if a computer automated design file were located in a directory dedicated to an accounting department, or if a document owned by an engineer or other technical personnel were located on an endpoint associated with a legal department employee, then this may indicate a misplace (either innocently or maliciously) document. A machine learning system, a rules-based system, an expert system or any other learning system or the like may be configured to recognize these outliers and exclude them from a training set, or to forward them for manual inspection prior to inclusion in a training set.

In another aspect, labeling the files includes labeling each of the plurality of files according to a category selected from two or more predetermined categories such as any of the classifications, categories or the like described herein. For example, the two or more predetermined categories may identify at least one of sensitivity, confidentiality, business value and the like. For example, sensitivity may indicate, e.g., whether a file contains personally identifying information or other personal data or the like that is not intended for public distribution or use. Confidentiality may relate to personally sensitive information, or may relate to information protected or intended to be kept secret by a corporate entity such as sales projections, customer lists, and so forth. Business value may be an estimated business value as describe above, any may be assigned as a continuous variable based on estimated value, or as a discrete category of business value such as high, medium or low. The predetermined categories may also or instead identify permissions for use of the plurality of files such as an access control list, permissions list, authorized user list, or the like. The two or more predetermined categories may also or instead identify organizational or departmental roles or the like associated with the files such as accounting, legal, engineering, management, human resources, and so forth. More generally any combination of these and/or any other categories or group of categories suitable for classifying files and applying an enterprise policy thereon may be used for categories as contemplated herein.

As shown in step 1106, the method 1100 may include configuring a recognition model to identify an appropriate one of the above categories or classifications to apply to a new file located within the enterprise network. For example, this may include configuring a recognition model, e.g., by training a machine learning model or the like, to identify the category from one of a number of predetermined categories for a new file based on a plurality of documents or other files in the labeled data set created in step 1104. For example, a machine learning system, a rules-based system, an expert system or any other learning system or the like may be configured to implement a given recognition model.

As shown in step 1108, the method 1100 may include locating other files such as documents in the enterprise network different than the plurality of files. In one aspect, locating other files includes locally searching for files with a local search agent on one or more endpoints within the enterprise network. Locating other files may also or instead include searching for files in a cloud storage facility for the enterprise network, or searching on shared storage resources such as a network directory, a shared folder, network attached storage, a storage area network, and so forth. Locating other files may also include querying enterprise-wide or endpoint-specific search engines, indices and the like, which may provide usefully information about the existence and location of files within an enterprise network.

As shown in step 1110, the method 1100 may include labeling files located in step 1108 using the recognition model configured in step 1106. For example, this may include associating a label with each of the other files located in step 1108 based upon the category selected for each of the other files from the two or more predetermined categories by the recognition model configured in step 1106. For example, this may include associating a label with each of the other files located in step 1108 based upon the category for sensitivity selected by the recognition model. As noted above, this may be based on any of a variety of file characteristics such as file location, file ownership, file function (e.g., finance, engineering, management, human resources, etc.), file permissions, directory ownership, directory permissions, and the like. This may also be based on other context such as file content, keywords (within files or in file metadata), and so forth.

As shown in step 1112, the method 1100 may include applying an enterprise policy based on the labels applied in step 1110, e.g., through a threat management facility or the like. For example, this may include applying an enterprise policy for sensitivity to each of the other files based upon the category identified in the label, wherein the enterprise policy controls at least one of file access and file movement. In general, this may include applying any suitable policy based on the category identified in such labels. The enterprise policy may, for example, control what users or user types can execute, open, edit, or delete a file, or the enterprise policy may control whether and where such files can be transmitted, either within the enterprise network or outside the enterprise network, or any combination of these. More generally, the enterprise policy may control file access and file movement, or any combination of these.

Where the categories include organizational roles, the enterprise policy may include one or more categories of authorized users associated with each of the two or more organizational roles. Similarly, the enterprise policy may include an access control list associated with each of the two or more organizational roles, e.g., to facilitate access to files on the basis or organization roles. The enterprise policy may also or instead include one or more use restrictions associated with at least one of the one or more organizational roles.

Figure 12:
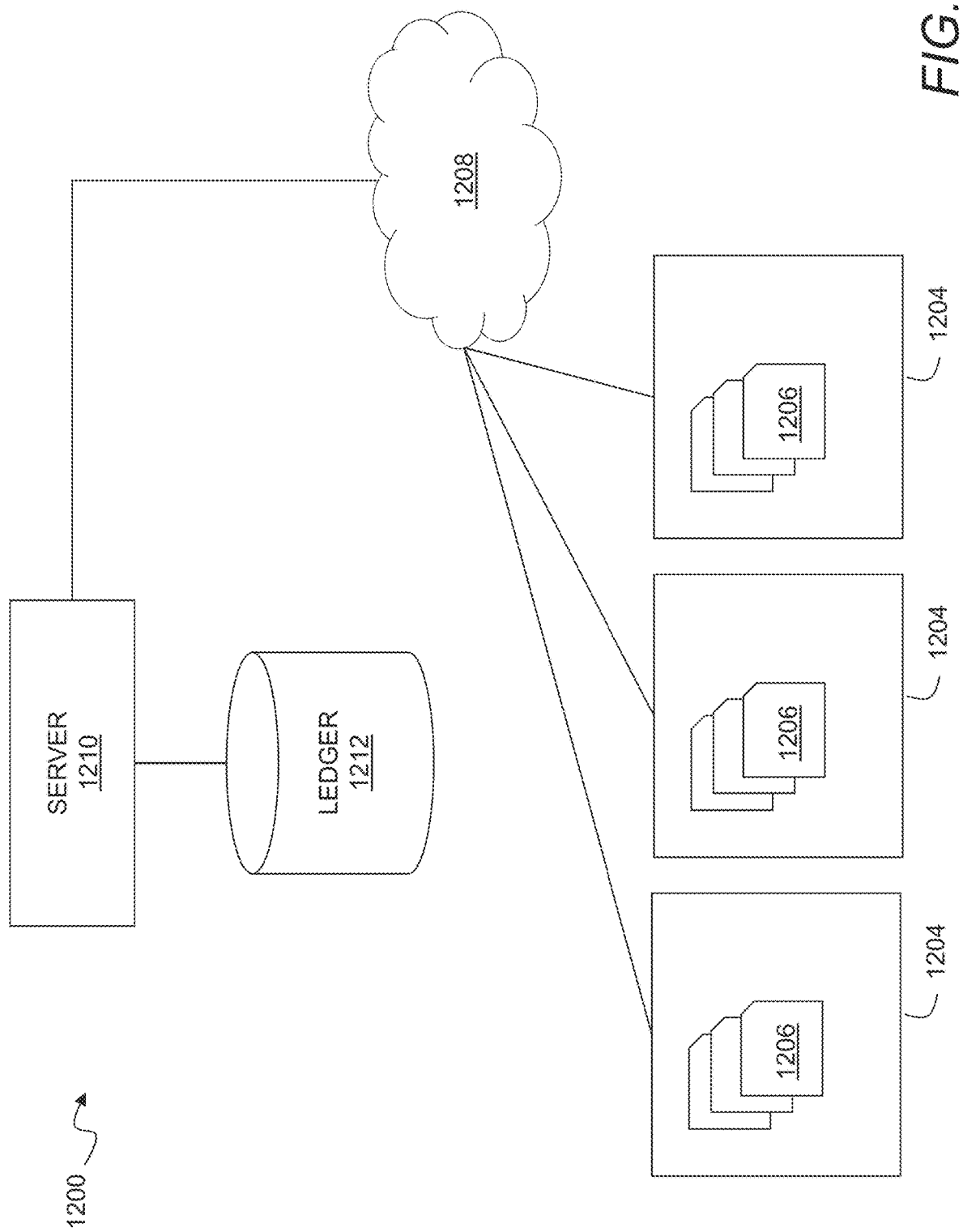
FIG. 12 shows a block diagram of a system for managing chain of custody for enterprise documents.

FIG. 12 shows a block diagram of a system for managing chain of custody for enterprise documents. In general, a ledger may store chain of custody information for files throughout an enterprise network. By identifying files with a homologous identifier such as a fuzzy hash that permits piecewise evaluation of similarity, the ledger can be used to track a chain of custody over a sequence of changes in content, ownership, and file properties. The ledger can be used, e.g., to evaluate trustworthiness of a file the first time it is encountered by an endpoint, or to apply enterprise policies based on trust.

In general, the system 1200 may include a plurality of endpoints 1204 storing a plurality of documents 1206, with an enterprise network 1208 interconnecting the plurality of endpoints 1204 in a communicating relationship. This may, for example, include any of the endpoints, documents (or other files or the like), and networks described herein.

A server 1210 may be coupled in a communicating relationship with the enterprise network 1208, and may store a ledger 1212 that contains a chain of custody for each of the plurality of documents 1206. In general, the chain of custody for each document 1206 may be formed of a record, or a number of records, in the ledger 1212 that includes contextual information such as a document owner, author or the like, along with one or more homologous identifiers such as fuzzy hashes or the like that permit identification of piecewise sets of identical bits (in an identical order) within the documents 1206. This facilitates file matching that is literally tied to file contents, while permitting an evaluation based on similarity rather than a strict identity of contents. This approach provides significant advantages over, e.g., cryptographic hashing which will typically yield a completely different hash when a single bit of a file is changed, and significant advantage over techniques using feature vectors or the like that might find similarity in the complete absence of substantially identical bit sequences within a file. Furthermore, suitable techniques for identifying homologous files are known in the art, such as fuzzy matching using, e.g., the open source ssdeep project, which provides a program for computing context triggered piecewise hashes, also referred to as fuzzy hashes.

Using these techniques, the server 1210, which may be a threat management facility or any other server contemplated herein, may be configured to respond to an information request containing a first fuzzy hash (or other homologous identifier), by matching the first fuzzy hash to one or more of the fuzzy hashes stored in the ledger and providing chain of custody information to a requestor for at least one of the plurality of documents corresponding to the one or more of the fuzzy hashes. The server 1210 may also or instead be configured to respond to an update request containing a second fuzzy hash by matching the second fuzzy hash to a matching one of the plurality of documents and adding the second fuzzy hash and related information to the chain of custody in the ledger for the matching one of the plurality of documents.

The server 1210 or some other threat management facility may also or instead be used to evaluate the trustworthiness of files based on similarity to other files in the ledger 1212 (along with the history of custody and modifications), and to apply an enterprise policy based on the assessment of trust.

Figure 13:
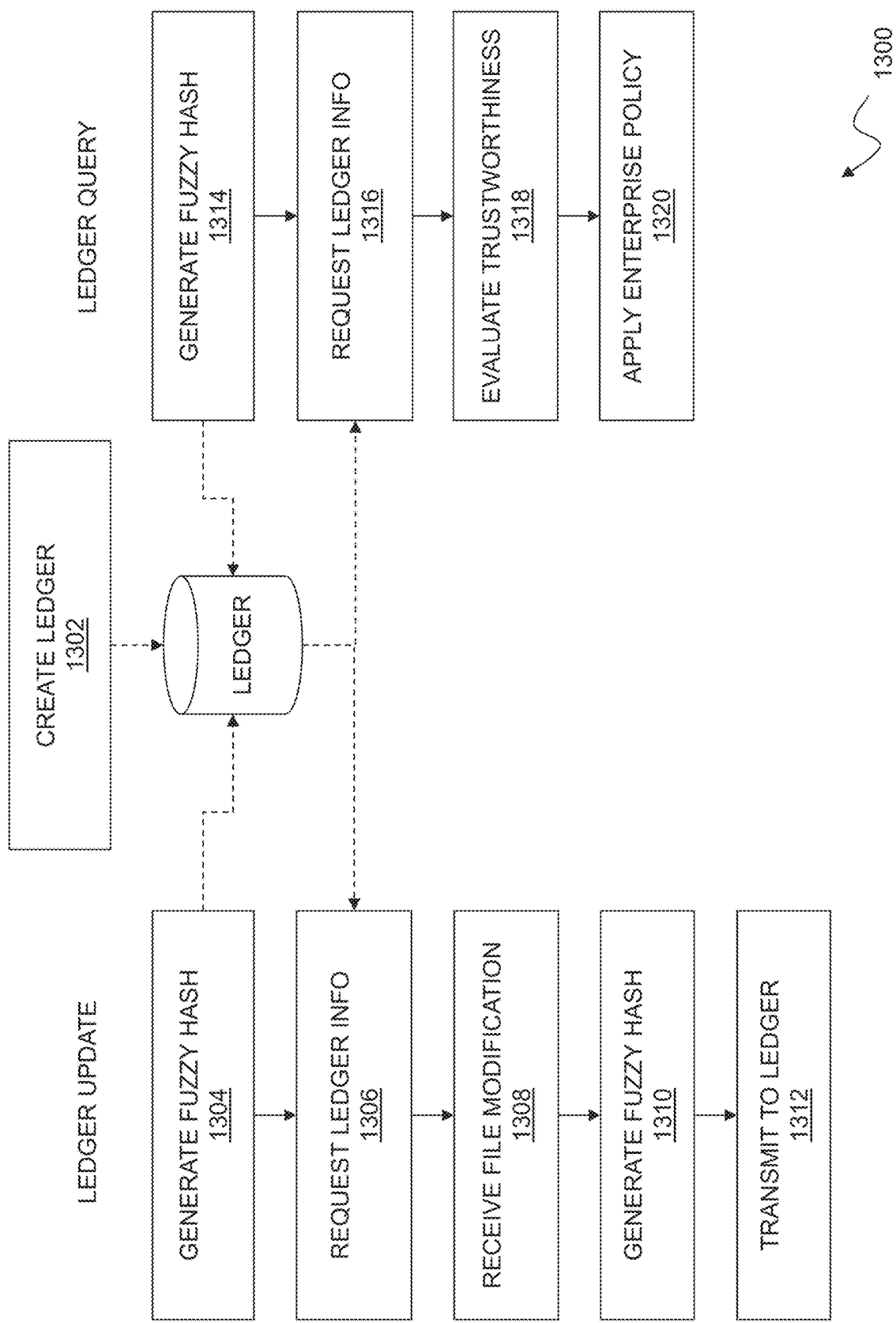
FIG. 13 shows a method for managing chain of custody for documents in an enterprise network.

FIG. 13 shows a method for managing chain of custody for documents in an enterprise network. This may particularly advantageous in contexts where the content of interest is hard to manage using digital rights management techniques, such as with configuration files or documents that regularly change over time. This may also be used in combination with the various sensors and events described herein to evaluate changes to files and the like in the context of other field information for a single endpoint or a number of endpoints on an enterprise network.

As shown in step 1302, the method 1300 may include creating a ledger containing document custody information. The ledger may initially be created through a background indexing process or the like that executes on endpoints within the enterprise network and provides initial source information, file metadata, and the like for local files, along with a homologous identifiers such as fuzzy hashes for evaluating similarity to other files. The data may be gathered for files distributed among endpoints within an enterprise network, or any other suitable domain, and aggregated within the ledger for use in subsequent chain of custody operations. In one aspect, the ledger may be periodically updated with new file scans. In another aspect, once an initial scan is completed, the ledger may be periodically updated as endpoints add, modify or delete files. This may also include performing a complete scan of each new endpoint that is added to the system, in which case each additional file may be checked against the ledger to see if the file, or a prior version of the file, already exists within the enterprise network.

The ledger may be stored in a database hosted at a threat management facility for the enterprise network, which may usefully provide a programmatic interface for submitting updates and queries to the ledger. In another aspect, the ledger may be stored in a cloud resource remotely accessible from the enterprise network. The ledger may also or instead include a distributed ledger, such as a blockchain, in which blocks of transactions are cryptographically secured and distributed throughout a network of participating devices, providing a useful combination of security, integrity, and redundancy. The chain of custody information stored in the ledger may be any information necessary or useful for tracking change to file custody and file contents as contemplated herein. For example, the chain of custody information may include an author and one or more users associated with a number of versions of a file. The chain of custody information may also or instead include at least one item that is cryptographically signed for authentication using a certificate from a trust authority such as a trusted platform module or a remote third party trust authority.

As shown in step 1304, the method 1300 may include generating a first fuzzy hash (or other homologous file identifier) for a file such as a document or other file for which custody information is to be requested. This may, for example, include calculating fuzzy hashes, e.g., for a file on an endpoint, over any suitable segment sizes, and with any suitable amount of overlap with adjacent segments. Thus, for example, segments may be relative large (e.g., megabytes) or small (e.g., kilobytes), and may include complete overlap and redundancy (e.g., 50% or more overlap with each adjacent segment), or no overlap. In general, a suitable segment size can be determined based on, e.g., typical files sizes of interest, processing capability, storage capacity, the desired sensitivity to file changes and so forth. In one aspect, this may include creating fuzzy hashes during the initial, indexing phase described above during which the ledger is created. In another aspect, this may occur when a file is opened, launched, or otherwise accessed for use on an endpoint. As depicted, step 1304 may include transmitting the first fuzzy hash to the ledger.

The fuzzy hash (and the other fuzzy hashes and homologous identifiers described herein) may, for example, include a context triggered piecewise hash or any other suitable identifier capable of uniquely identifying sequences of bits within a file or otherwise providing a computational basis for evaluating literal (e.g., bitwise) similarity between documents, or otherwise supporting tracking of changes in a manner suitable for use in a chain of custody method as described herein. The file may include any document, file or the like for which chain of custody information might usefully be tracked as described herein. For example, the file may include a document selected from a group consisting of a word processing document, a spreadsheet, an image, an audio file, and a video file. The file may also or instead include computer executable code selected from a group consisting of source code, byte code, compiled code, and script.

As shown in step 1306, the method 1300 may include requesting information such as chain of custody information for the file from the ledger. This may be based on the first fuzzy hash (or other homologous identifier) generated for the file in step 1304. The ledger, or a server such as a threat management facility responsible for maintaining and providing access to the ledger, may respond with chain of custody information based on this request. As depicted, step 1306 may also include receiving responsive chain of custody information from the ledger.

It will be understood that, in a ledger update process (as illustrated in the left hand column of FIG. 13), steps 1304 and 1306 may be omitted, and fuzzy hashes may simply be computed and transmitted to the ledger for archiving, although an update that occurs during a modification or the like may commonly result in fuzzy hashes that are added to a pre-existing chain of custody that includes previously generated fuzzy hashes.

As shown in step 1308, the method 1300 may include receiving a modification to the file. This may, for example, include a user edit, a system edit, or any other revision from any other entity or user within the enterprise network. This may include changes by an original author of a file, or modifications by a user different than the author of the file, or any combination of these.

As shown in step 1310, the method 1300 may include generating a second fuzzy hash for the file. A variety of events may be used to trigger generation of the second fuzzy hash. For example, the second fuzzy hash may be generated when the file is opened or launched on an endpoint, when the file is closed on the endpoint, when the file is saved, or based on some other file operation or the like. In another aspect, the second fuzzy hash may be generated on a scheduled basis, such as once per hour, once per day or the like. In another aspect, a combination of these techniques may be used. For example, hashes may be created and transmitted to the ledger frequently when a file is in use, and infrequently or never when a file is closed. Similarly, other security events such as a potential compromise or data leakage, may be used to trigger the creation of new fuzzy hashes for an endpoint, or for a directory or particular files on the endpoint. The frequency of hashing may also depend, e.g., on an estimated business value for a particular file or any other criteria indicative of commercial value, threat protection or the like.

As shown in step 1312, the method may include transmitting the second fuzzy hash to the ledger for inclusion in a chain of custody for the file. It will be understood that, while the method is described in terms of a single fuzzy hash, any number of fuzzy hashes (or other homologous identifiers or the like) may be created for each file for which the chain of custody is being tracked in the ledger.

As shown in step 1314, the method 1300 may include generating fuzzy hashes or other homologous identifiers using any of the techniques described herein, such as those described in step 1304 above. As shown in step 1316, the method may include requesting chain of custody information from the ledger based on the hash using any of the techniques described herein, such as those described in step 1306 above.

As shown in step 1318, the method 1300 may include evaluating a trustworthiness of the file based on the chain of custody information received from the ledger. This may include an analysis of the amount and type of changes to the file, the entity or entities making the changes, and any other suitable contextual information such as the type of file (include classifications or categories such as those described above) and the number of different users making changes. For example, even a small number of changes by an unknown entity to a file from a trusted vendor may be suspicious, and lead to a determination of low trustworthiness. On the other hand, a large number of changes to a shared document in a shared folder by different users sharing a common department or organizational role may not be suspicious. Thus in one aspect, evaluating the trustworthiness of the file includes determining an amount of change to the file from one or more other files identified in the ledger. This may be determined based on a similarity of a homologous file identifier such as a fuzzy hash for the file to one or more other homologous file identifiers for the one or more other files identified in the ledger. In another aspect, evaluating the trustworthiness of the file may include evaluating a trustworthiness of one or more users associated with the file in the chain of custody information.

As shown in step 1320, the method 1300 may include applying an enterprise policy to the file based on the trustworthiness. The enterprise policy may include any rules or the like for using and managing files based on trustworthiness. For example, applying the enterprise policy may include blocking or allowing access to the file at an endpoint in the enterprise network. Applying the enterprise policy may include blocking or allowing a transmittal of the file through the enterprise network. In another aspect, applying the enterprise policy may include deploying a remedial measure based on a low trustworthiness of the file. For example, where the file is an untrustworthy executable, the file may be quarantined, and an endpoint hosting the file may be scanned, quarantined, or otherwise treated as a compromised network asset. In another aspect, where the nature of changes suggest high entropy suggestive of ransomware, suitable remediate measures may be taken to stop modifications to the file, locate an archival copy, and so forth. More generally, any pattern of modifications suggestive of malware deployment or other malicious activity may be used to trigger deployment of corresponding remedial measures. In general, a policy may be a static or dynamic policy, for example, as described herein.

In embodiments, combination of trustworthiness information, for example as determined from chain of custody information, and labels determined from file recognition or comparison, may be used to determine labels, policy, or control of files. The business value of the files also may be taken into account. For example, a high business value document belonging to accounting or management may be flagged if the chain of custody for a version of the document shows that it is being viewed by non-accounting and/or non-management personnel. In this manner, for example, activity such as inappropriate use or exfiltration of sensitive information such as financial information in violation of an enterprise policy may be detected when an unauthorized user appears in the chain of custody. It will also be understood that chain of custody information may generally be used prospectively, e.g., to determine whether a newly detected user/editor is appropriate for the corresponding content, or retrospectively, e.g., to draw policy or security conclusions based on a history of users and file usage. These techniques may also be used at varying levels of granularity, e.g., by using fuzzy hashes to identify whether the changes by a user affect sensitive information, or to estimate whether the amount of change appears consistent with the corresponding user. More generally, this disclosure contemplates any combination of the foregoing techniques useful for managing content distributed in an enterprise network and enforcing enterprise network policies, and all such combinations are intended to fall within the scope of this disclosure.

It will be appreciated that, while trustworthiness is used herein as a term of relative safety, any other metric or descriptor indicative of safety versus threat may also or instead be used. Thus, for example, the chain of custody information may be used to evaluate authenticity, data integrity, safety, and so forth, and any such metric or criterion may be used to support the application and enforcement of enterprise policies as contemplated herein.

Figure 14:
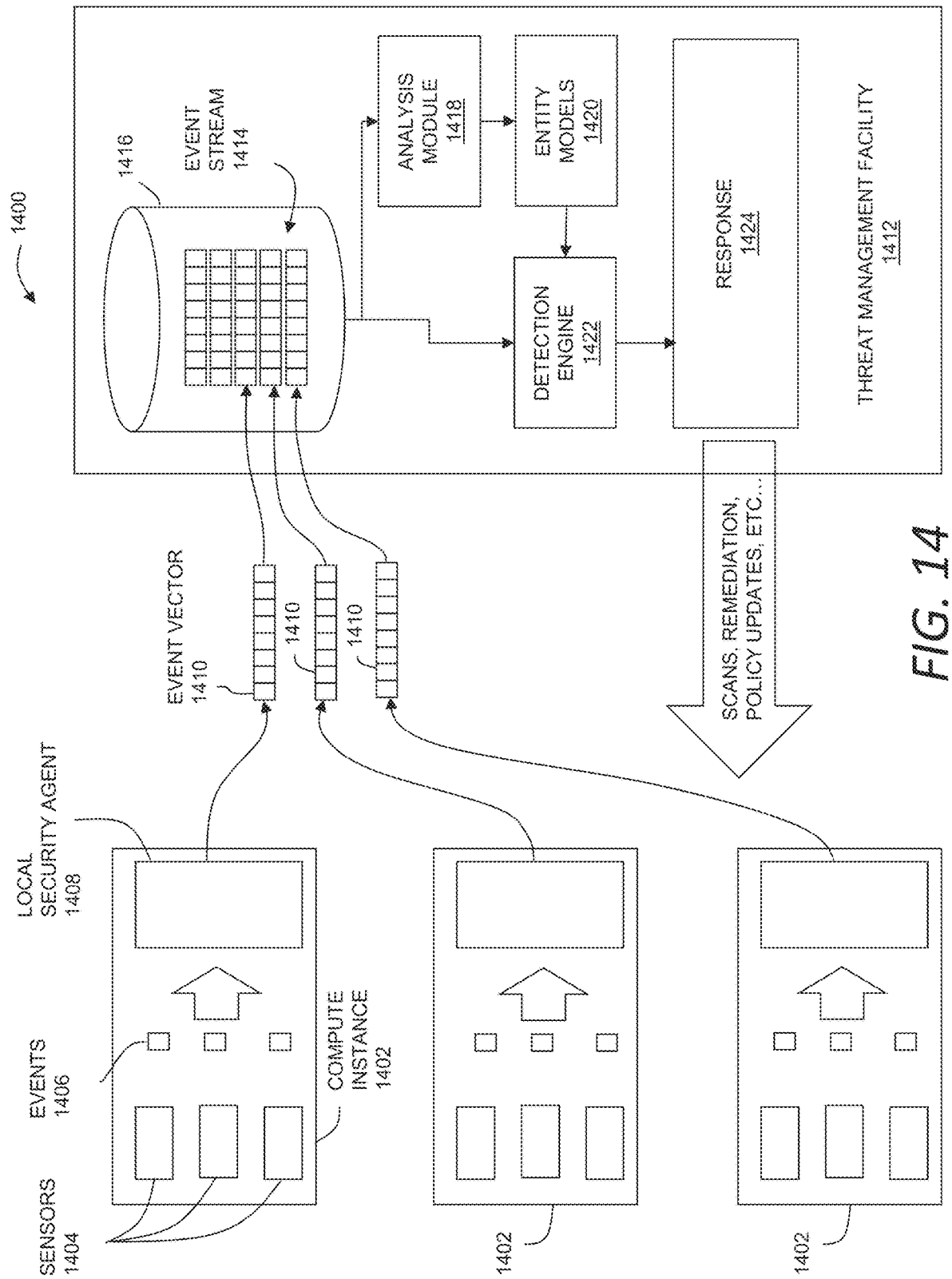
FIG. 14 shows a system for event monitoring and response.

FIG. 14 shows a system for event monitoring and response. In general, the system may include a number of compute instances 1402 that use local security agents 1408 to gather events 1406 from sensors 1404 into event vectors 1410, and then report these event vectors 1410 to a threat management facility 1412. The threat management facility 1412 may store the event vectors 1410 from a number of compute instances 1402 as a data stream 1414 in a data repository 1416 such as a memory or other data store of the threat management facility 1412. The event stream 1414 may be analyzed with an analysis module 1418, which may in turn create entity models 1420 useful for detecting, e.g., unexpected variations in behavior of compute instances 1402. A detection engine 1422 may be applied to the event stream 1414 in order to detect unusual or malicious activity, e.g. based on the entity models 1420 or any other techniques. Where appropriate, the threat management facility 1412 may deploy responses to the compute instances 1402 using a response facility 1424.

The compute instances 1402 may be any of the compute instances described herein, including without limitation any physical device such as a laptop, desktop, gateway, router, firewall, smartphone, tablet, or the like, as well as a virtualized instance of any of the foregoing or any other computer, user device, container or the like. The sensors 1404 and events 1406 may also generally be any of the sensors and events described herein. The local security agent 1408 may be any of the security agents described herein, or any other software component or the like executing on or in association with one of the compute instances 1402 to locally manage security of the compute instance and/or coordinate security services with the threat management facility 1412 and other remote resources.

The local security agent 1408 may collect events 1406 from sensors 1404 on the compute instance 1402, and form the collected events 1406 into event vectors 1410 for communication to the threat management facility 1412. The sensors 1404 and/or local security agent 1408 may usefully process events 1406 in a number of ways in order to facilitate communication, computational efficiency, or downstream processing. For example, events 1406 may be tokenized. That is, a process that causes or creates an event 1406 may be assigned a number or other identifier, which may be used locally by a compute instance or globally within the enterprise to identify a particular, known process. An event 1406 may also encode (tokenized or otherwise) a relationship among different processes. For example, for a particular process that caused an event 1406, a parent-child relationship or other dependency with other processes may be encoded by providing process identifiers or the like within the event 1406, along with information characterizing the relationship among the processes. A Uniform Resource Locator or other information for identifying resources or network locations may also be tokenized or otherwise processed to support efficiency, consistency and the like. For example, a URL may be encoded in an event 1406 as a hash of a URL, or as a portion of a URL, or some combination of these (e.g., a literal encoding of the top level domain, and a hash of some or all of the remaining path information). Other events 1406 such as registry changes, system calls, remote procedure calls and the like may be literally encoded into an event 1406 where they are relatively compact, or identified using any suitable tokenization, compression, or the like.

Other techniques may also or instead be used. For example, user-specific or machine-specific information may be altered where appropriate to anonymize the event vectors 1410 and mitigate exposure of sensitive information during network communications. An event vector 1410, or individual events 1406 therein, may also or instead be encrypted in order to secure the contents against malicious interception. In another aspect, the events 1406 or event vectors 1410 may be compressed to conserve network resources. The event vectors 1410 may also or instead be prioritized, e.g., in order to increase sensitivity and decrease response times for event vectors 1410 associated with a high likelihood of malicious activity. In this latter aspect, the local security agent 1408 may locally analyze events 1406 and/or event vectors 1410 in order to permit suitable prioritization, as well as to support local detection and response to malicious, or potentially malicious activity.

It will also be appreciated that events 1406 and/or event vectors 1410 may usefully be labelled in a variety of ways. While labeling with process identifiers is described above, this may also or instead include an identification of an entity associated with the event 1406 or event vector 1410. In this context, the entity may be any physical, logical, or conceptual entity useful for monitoring activity of compute instances 1402 as described herein. For example, the entity may include a user, a physical device, a virtualized machine, an operating system, an application, a process, a hardware subsystem (e.g., a network interface card, USB drive, camera, etc.), a network resource, a domain controller, a remote software service, and so forth. It should also be understood that the various entity types may be concurrently associated with a particular event 1406, sensor 1404, or event vector 1410, or particular events 1406 may be associated with multiple entities or event vectors 1410. Thus for example, storing a file may be an event 1406 associated with a particular user, a particular machine, a particular operating system, a particular physical storage device, and so forth.

In one aspect, the event vectors 1410 may be organized around entities. Thus for example, a request for access to a network resource may be an event 1406. When such a request is initiated by a user, an event vector 1410 for that user may be created and reported along with other temporally adjacent or otherwise related events 1406 associated with that user. Where the network request involves an interaction with, e.g., an authentication and identity management system, this may be represented as another entity, or as an event 1406 (or group of events 1406) in the event vector 1410 for the user. At the same time, a second event vector 1410 for the compute instance 1402 may also be created and reported along with other temporally adjacent or otherwise related events 1406 associated with that compute instance 1402. Alternatively, the event vectors 1410 may be organized around chronology. That is, groups of events 1406 within a window of time may be reported as an event vector 1401. The event vectors 1410 may also or instead be organized around other aspects of the system 1400, such as particular sensors 1404 or groups of sensors 1404, causal relationships among events 1406, particular triggers, types of activity (e.g., network communications, operating system, processes, etc.) and so forth. In general, the source of each event 1406, such as a particular sensor 1404, or some entity, computing object or the like associated with the sensor 1404, may be encoded with the event 1406 to permit explicit identification by the threat management facility 1412 or other downstream processing resources. Although depicted in FIG. 14 as having similar size, it will also be understood that the event vectors 1410 may be any size, and may usefully encode any number of different events 1406.

The event vectors 1410 may be received by the threat management facility 1412 and stored as an event stream 1414 in a data repository 1416, which may be any data store, memory, file or the like suitable for storing the event vectors 1410. The event vectors 1410 may be time stamped or otherwise labeled by the threat management facility 1412 to record chronology. In general, the event stream 1414 may be used for analysis and detection as further described herein.

In general, an analysis module 1418 may analyze the event stream 1414 to identify patterns of events 1406 within the event stream 1414 useful for identifying unusual or suspicious behavior. In one aspect, this may include creating entity models 1420 that characterize behavior of entities, such as any of the entities described herein. Each entity model 1420 may, for example, include a multi-dimensional description of events 1406 for an entity based on events 1406 occurring over time for that entity. This may be, e.g., a statistical model based on a history of events 1406 for the entity over time, e.g., using a window or rolling average of events 1406.

The entity models 1420 may, for example, be vector representations or the like of different events 1406 expected for or associated with an entity, and may also include information about the frequency, magnitude, or pattern of occurrence for each such event 1406. In one aspect, the entity model 1420 may be based on an entity type (e.g., a particular type of laptop, or a particular application), which may have a related event schema that defines the types of events 1406 that are associated with that entity type. This may usefully provide a structural model for organizing events 1406 and characterizing an entity before any event vectors 1410 are collected, and/or for informing what events 1406 to monitor for or associate with a particular entity.

As an event stream 1414 is collected, a statistical model or the like may be developed for each event 1406 represented within the entity model so that a baseline of expected activity can be created. In one aspect, an existing model may be used, e.g., when the entity or entity type is already known and well characterized. The entity model may also or instead be created by observing activity by the entity (as recorded in the event stream 1414) over time. This may include, for example, monitoring the entity for an hour, for a day, for a week, or over any other time interval suitable for creating a model with a sufficient likelihood of representing ordinary behavior to be useful as a baseline as contemplated herein. In one practical example, certain software applications have been demonstrated to yield a useful baseline within about two weeks. It will also be understood that, once an entity model is created, the entity model may usefully be updated, which may occur at any suitable intervals according to, e.g., the length of time to obtain a stable baseline, the amount of activity by the entity, the importance of the entity (e.g., to security, operation of a compute instance 1402, and so forth), or any other factors.

These techniques may be used to create an entity model 1420 for any of the entities described herein, including without limitation physical hardware items, virtualized items, software items, data and date stores, programming interfaces, communications interfaces, remote resources, and so forth, or any of the other entities, computing objects, assets or the like described herein. In one aspect, the entities may be arranged around a conceptual stack for an endpoint in an enterprise network, such as by providing entities for a domain controller, a compute instance, a user, an operating system, a library, an application, a process, and data. This may also or instead include any of a number of physical devices such as a laptop, a desktop, a gateway, a router, a firewall, a smartphone, a tablet, a personal computer, a notebook, a server, a mobile device, an IoT device. The entity may also or instead include hardware subsystems such as a peripheral, a keyboard, a mouse, a display, a network interface card, a USB drive, a camera, a disk drive or other physical storage device, and so forth. The entity may also or instead include a virtualized instance of any of these physical devices or systems, or any other virtualized compute instance or other computing resource such as a virtual machine, a hypervisor, or the like. In another aspect, this may include computing objects or resources such as a container, an operating system, a library, an application, a process, a file or other data, or the like. An entity may also or instead include remote resources, such as a cloud computing resource, cloud data resource, remote software service, or any other network resource or the like. An entity may also include other entities such as a user or related identity, or more specific system resources such as a kernel driver, system registry, process cache, and so forth. More generally, any physical, virtual, logical or other computing resource, asset, or the like that can usefully be instrumented and/or monitored to provide events for use as contemplated herein may be an entity as that term is used in this description.

As noted above, the entities of interest here may exist non-exclusively at various levels of hardware and software abstraction, and the entity models may similarly be of varying and overlapping scope. By way of a non-limiting example, an entity model for a laptop may include applications running on the laptop. In one aspect, the entity model may incorporate all network activity by the laptop, while in another aspect, network activity may be associated with the entity models for specific applications. Or the network activity may be associated with both entities, e.g., such that a single event is incorporated into multiple event vectors associated with multiple entities. In general, these design choices may affect the granularity of detections, the amount of processing and communications overhead, and so forth, and any such variations consistent with deployment within an enterprise network as contemplated herein are intended to fall within the scope of this disclosure.

According to the foregoing, in one aspect an entity model may contain a schema or the like describing events associated with an entity (or a type of entity), along with information about normal or expected behavior for each event 1406 associated with the entity. In one aspect, an entity type (e.g., laptop, or laptop by manufacturer X, or virtual machine in environment Y) may be used to select a schema for an entity model, while activities of a particular instances of that entity type may be used to generate the baseline for the entity model used in detections and the like. Thus, for example, if a user installs an office productivity suite, an entity model for that entity type may be selected based on the types of events 1406 known to be associated with the use the application, or the capabilities of the application. However, different users may use the software differently, so the baseline of expected behavior may be evaluated for a particular installation of the application by monitoring activity of the application over time. In another aspect, the schema for an entity model may itself be extensible. That is, the schema of different events 1406 may be created based on observations of activity associated with the entity. When a new type of event 1406 is detected for that entity, the event 1406 may be added to the schema for a corresponding entity type.

Once an entity model 1420 has been created and a stable baseline established, the entity model 1420 may be deployed for use in monitoring prospective activity. This monitoring may, for example, use the same event stream 1414 that was used to create the entity model 1420, or a filtered or otherwise processed version of the event stream 1414. It will be appreciated that the entity models 1420 may generally be deployed as fixed or relatively static or discrete models, or any one or more of the entity models 1420 may be continuously updated so that they change over time as new information becomes available, e.g., in the event stream 1414 or otherwise.

The detection engine 1422 may compare new events 1406 generated by an entity, as recorded in the event stream 1414, to the entity model 1420 that characterizes a baseline of expected activity. By representing the entity model 1420 and the event vectors 1410 in a common, or related, vector space, deviations from expected behavior can usefully be identified based on the vector distance between one or more event vectors 1410 and the entity model 1420. This comparison may usefully employ a variety of vector or similarity measures known in the art. For example, the comparison may use one or more vector distances such as a Euclidean distance, a Mahalanobis distance, a Minkowski distance, or any other suitable measurement of difference within the corresponding vector space. In another aspect, a k-nearest neighbor classifier may be used to calculate a distance between a point of interest and a training data set, or more generally to determine whether an event vector 1410 should be classified as within the baseline activity characterized by the entity model.

It will be understood that, while event vectors 1410 and entity models 1420 as described herein provide one useful technique observing deviations from a baseline of expected behavior by entities within an enterprise, the detection engine 1422 may also or instead employ other detection techniques based on the event stream 1414, e.g., to support real time detection of suspicious or malicious behavior. For example, certain events 1406 may be independently and directly indicative of malicious activity, such as initiating communications with a known command and control center for an advanced persistent threat. Other events 1406 may be potentially indicative of malicious activity, such as initiating disk-wide encryption or transmitting sensitive information from an endpoint. While tools exist for detecting these types of malicious activity, relevant events 1406 may be present in the event stream 1414, and the response facility 1424 may usefully trigger additional analysis, investigation, or other responses based on the event stream 1414 instead of or in addition to monitoring for deviations from entity baselines. In another aspect, concurrent deviations by different entities, or a pattern of deviations for a single entity or among entities, may also be usefully monitored. For example, a deviation in the behavior of a trusted application across multiple compute instances 1402, either concurrently or in succession, may indicate a rollout of a software update rather than malicious behavior. Conversely, if a number of compute instances 1402 concurrently begin contacting an unknown network address, this may be an indication of malware propagating among devices in an enterprise network. More generally, deviations among different entities, or among multiple instances of a particular entity, may provide useful information about actual or potential causes of the change, and may inform subsequent manual or automated investigations.

In general, where the event stream 1414 deviates from a baseline of expected activity that is described in the entity models 1420 for one or more entities, any number of responses may be initiated by the response facility 1424 of the threat management facility 1412. In one aspect, this may include deployment of known remediations for malicious activity such as quarantine, termination of network communications, termination of processes or applications, an increase in local monitoring activity on affected compute instances 1402, messages to a network administrator, filtering of network activity, antivirus scans, deployment of security patches or fixes, and so forth. This may also in policy updates. For example, security policies for compute instances 1402, users, applications or the like may be updated to security settings that impose stricter controls or limits on activity including, e.g., limits on network activity (bandwidth, data quotas, permitted network addresses, etc.), limits on system changes (e.g., registry entries, certain system calls, etc.), limits on file activity (e.g., changes to file permissions), increased levels of local activity monitoring, and so forth.

Figure 15:
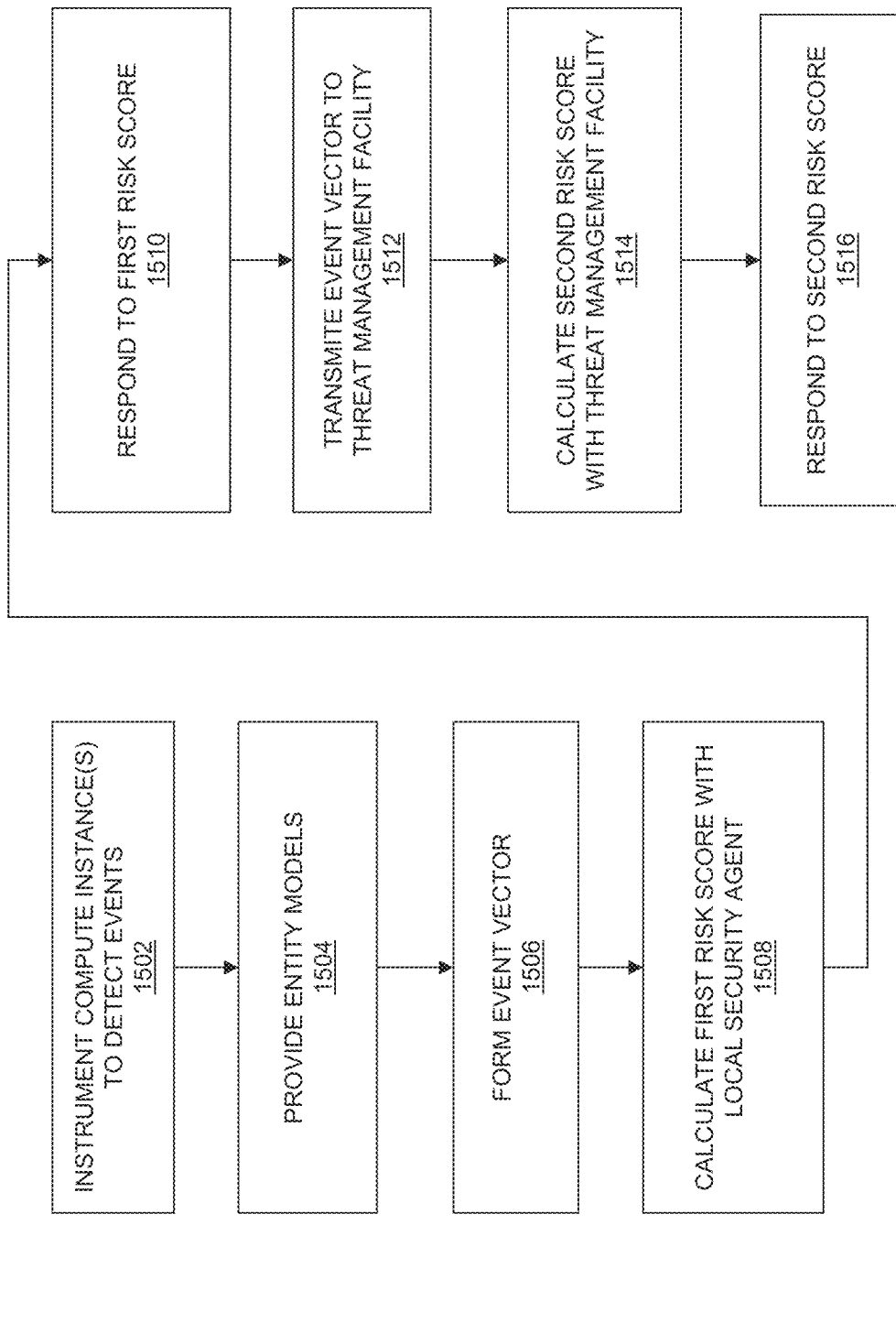
FIG. 15 shows a method for using dynamic entity models to improve network security.

FIG. 15 shows a method for using dynamic entity models to improve network security. In general, a security platform may use a sensor-event-analysis-response methodology to iteratively adapt to a changing security environment by continuously creating and updating entity models based on observed activities and detecting patterns of events that deviate from these entity models.

As shown in step 1502, the method 1500 may include instrumenting a compute instance in the enterprise network with a number of sensors to detect events from a number of computing objects associated with the compute instance. This may more generally include instrumenting any number of compute instances, such as any of the compute instances described herein, with any number of sensors.

As shown in step 1504, the method 1500 may include providing entity models such as a first entity model for local use at a compute instance and a second model for use at a threat management facility. In one aspect, this may include storing the first entity model at a local security agent for the compute instance. The entity model may be for any of a number entities such as a domain controller, a physical device, a user, an operating system, or an application associated with the compute instance. In general, the first entity model may be any of the entity models described herein. For example, the first entity model may be a model characterizing a pattern of events expected from the number of sensors in a vector space, also referred to herein as the event vector space or the event feature space, that characterizes events that are modeled within the system. The method 1500 may include storing a second entity model for the entity at a threat management facility for the enterprise network. The second entity model may characterize a second pattern of events expected from the number of sensors in the vector space. The second entity model may be for any of the entities described herein, including without limitation a domain controller, a physical device, a user, an operating system, an application associated with the compute instance, and so forth. Thus, entity models may be provided on a compute instance for use by, e.g., a local security agent for the compute instance, and at a threat management facility for use by the threat management facility. These entity models may be the same, or may be adapted for their intended use. For example, entity models stored in the threat management facility may be updated more frequently, and/or entity models deployed to local security agents may be simplified and/or adapted for different types of detection or sensitivity. In another aspect, the entity model at the threat management facility may be dynamically adjusted to a global baseline for the relevant entity, e.g., for all instances of the entity throughout the enterprise, while the entity model at the compute instance may be dynamically adjusted to a local baseline for the relevant entity based on behavior of the entity on the compute instance.

As shown in step 1504, the method 1500 may include receiving events from the number of computing objects at a local security agent on the compute instance. In general, this may include any of the events, computing objects, security agents, and compute instances described herein.

As shown in step 1506, the method 1500 may include collecting a plurality of the events into an event vector in the vector space. As noted above, this may include tokenizing, normalizing, encrypting, compressing, prioritizing, or otherwise processing individual events and/or the event vector formed from these individual events.

As shown in step 1508, the method 1500 may include calculating a first risk score with the local security agent based on a first distance between the event vector and the first entity model in the vector space. As noted herein, this may usefully include any distance measure or the like suitable for evaluating similarity or distance in a multi-dimensional space. For example, the Euclidean distance provides a useful measure of distance where the various dimensions of interest have normalized units or dimensions (e.g., where all axes are scaled to unit variance). The Mahalanobis distance may also generally be used for the measurement of a multi-dimensional distance between a point and a distribution (e.g., an event vector and a suitably modeled entity model). In another aspect, the Bhattacharyya coefficient measures the amount of overlap between two statistical samples or populations, and may be usefully applied to evaluate the similarity of an event vector to an entity model. Techniques such as the k-nearest neighbors algorithm may also or instead be used to evaluate similarity or closeness in a feature space where n-dimensional vectors of numerical features such as the event vectors are expressed.

As shown in step 1510, the method 1500 may include responding to the first risk score. For example, when the first risk score exceeds a first threshold, the method 1500 may include deploying a first remedial action for the compute instance from the local security agent. In this context, the remedial action may be any remedial action including threat responses, security updates and patches, quarantines, changes in privileges or network capabilities, increased monitoring, forensic data capture, manual intervention, and so forth. It should also be appreciated that the threshold may be a static threshold that is selected and retained indefinitely, e.g., until changed by an administrator or the like, or the threshold may be a dynamic threshold that varies over time. For example, the threshold may be algorithmically determined on any suitable schedule, such as hourly, daily, weekly and so forth. Or the threshold may be algorithmically determined and updated on an ongoing or effectively continuous basis as new data relevant to determining a suitable threshold becomes available.

As shown in step 1512, the method 1500 may include transmitting the event vector to a threat management facility such as any of the threat management facilities or other security services or facilities described herein.

As shown in step 1514, the method 1500 may include calculating a second risk score with the threat management facility based on a second distance between the event vector and the second entity model. It will be understood that the threat management facility may usefully perform different calculations than those performed by the local security agent in step 1508. For example, the threat management facility may have greater computational resources available for evaluation, and may thus usefully perform more computationally expensive risk assessments, particularly where there is an opportunity to improve detection of deviations and or malicious activity. In another aspect, the threat management facility may have access to more recent entity models, and may be able to update an entity model with greater frequency than a lightweight security agent based on, e.g., recent behavior by multiple instances of an entity distributed throughout an enterprise network.

In another aspect, the threat management facility may apply multi-entity or multi-event vector analysis, e.g., to provide risk scores based on concurrent analysis of event vectors from multiple different entities, or multiple instances of particular entities. Thus, for example, the threat management facility may access an event stream that includes event vectors from all instances of an application executing throughout an enterprise, and may perform risk scoring based on, e.g., shared deviations among some or all of these instances of the entity. According to the foregoing, in one aspect, calculating the second risk score may include evaluating the second risk score based on an event stream from two or more compute instances within the enterprise network. In another aspect, the second entity model used to calculate the second risk score may include one or more events from a second compute instance, a second entity in the enterprise network, or any number and combination of other compute instances or other entities.

As shown in step 1516, the method 1500 may include responding to the second risk score. For example, when the second risk score exceeds a second threshold, the method 1500 may include deploying a second remedial action for the compute instance, such as any of the remedial actions or other responses described herein, from the threat management facility. As noted above, the threshold may be algorithmically determined or manually specified by an administrator, or some combination of these. Furthermore, as with other thresholds, windows, intervals and the like described herein, the threshold may be dynamically updated on any suitable schedule, or in response to new events or changes in context, e.g. as new data relevant to selecting the threshold becomes available, as new threats or risks are identified, and so forth.

In another aspect, there is disclosed herein a system that operates according to the method 1500 described above. For example, the system may include a local security agent on a compute instance in an enterprise network and a threat management facility for the enterprise network. The local security agent may be configured, e.g., by computer executable code executing on the compute instance, to generate one or more event vectors each including a collection of events for an entity associated with the compute instance, to locally determine a first risk score based on a first deviation of one of the event vectors to an entity model for the entity associated with the compute instance, and to report each of the event vectors to a remote resource. The threat management facility may be configured, e.g., by computer executable code executing on the threat management facility, to operate on an event stream including event vectors reported from each of a plurality of compute instances including the compute instance, and to calculate a second risk score based on a second deviation of one or more of the event vectors in the event stream from one or more corresponding entity models associated with the plurality of compute instances.

The threat management facility may be configured to deploy a remedial measure for the compute instance when at least one of the first risk score and the second risk score exceeds a threshold. As described herein, the first risk score may be indicative of deviations from an activity baseline for the event vectors for the compute instance. The activity baseline may be determined based on a historical window of event vectors for the compute instance. The second risk score may be indicative of deviations from an activity baseline for the event stream received at the threat management facility, and may be based upon the same or different entity models, the same or different entities, and so forth. The threshold for the risk scores and/or the historical window may be deterministically specified, algorithmically determined, automatically adjusted, and otherwise statically or dynamically deployed as more generally described herein.

The activity baseline for the first risk score or the second risk score may be periodically recalculated for a new historical window. For example, where the activity baseline is evaluated over a window of two weeks, once established the activity baseline may be recalculated once per day, once every two days, once per week, or over any other suitable interval. In one aspect, recalculation of the baseline may be dynamically triggered, e.g., by an increase in detected deviations above a predetermined threshold (which may be statically or dynamically evaluated), or the additional or removal of compute instances from the enterprise network.

The entity characterized by the entity model may be, for example, a domain controller, an identity and access management system, a physical device, a user, an operating system, an application associated with a compute instance, a process, a peripheral or other hardware device, a data store, and so forth, as well as combinations of the foregoing. As described above, a variety of techniques may be used to represent an entity model, and to compare event vectors to the entity model. For example, first risk score or the second risk score may be calculated based on a distance between at least one of the event vectors and the entity model in a vector space. The first risk score and the second risk score may also or instead be evaluated using a k-nearest neighbor algorithm. In another aspect, the second risk score may be calculated based on a distance between the event stream and the one or more corresponding entity models in a vector space. In one aspect, the one or more corresponding entity models may also or instead include models for a number of entities within the enterprise network selected from the group consisting of a domain controller, an identity and access management system, a physical device, a compute instance, a user, an operating system, and an application associated with the compute instance, as well as any of the other entities described herein and combinations of the foregoing.

The event vectors within the event stream may be processed in any of the ways described herein. For example, the event stream may include a plurality of anonymized event vectors. In another aspect the event vectors in the event stream may be one or more of tokenized, encrypted, compressed, and prioritized, or otherwise processed to support scalability, efficiency, privacy or other design and performance objectives.

Figure 16:
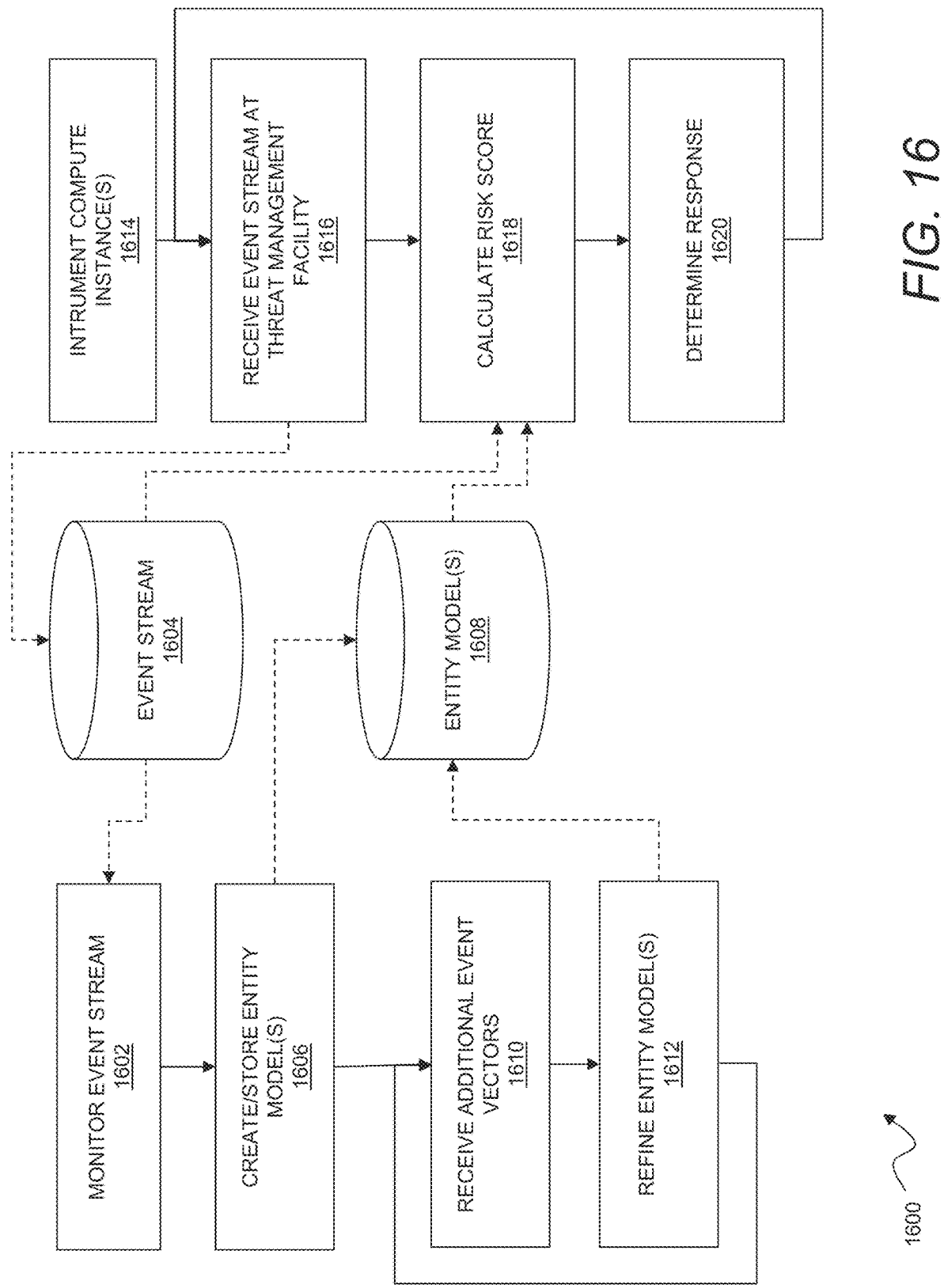
FIG. 16 shows a method for centralized event detection.

FIG. 16 shows a method for centralized event detection. In general, a threat management facility may store a number of entity models that characterize reportable events from one or more entities. A stream of events from compute instances within an enterprise network can then be analyzed using these entity models to detect behavior that is inconsistent or impossible for one or more of the entities that are currently active within the enterprise network. For example, these entity models may be used to evaluate riskiness of entities, either individually or in groups, in order to mitigate or facilitate detection of suspiciousness or potential security compromises within an enterprise network. These individual or aggregated risk assessments can be used in turn to select suitable settings for a security policy for compute instances within the enterprise network. A security policy may specify any of a number of security settings such as network speed, filtering levels, network isolation, and the like.

As shown in step 1602, the method 1600 may begin with monitoring an event stream 1604. This may include instrumenting compute instances, and then gathering events into event vectors for reporting to a threat management facility as described herein. This may also or instead include any other techniques for monitoring activity by compute instances to obtain data for establishing a baseline of activity by various entities associated with the compute instances.

As shown in step 1606, the method 1600 may include creating an entity model 1608 based on a baseline of event vectors for the entity in the event stream 1604 over an interval. As with the other windows and thresholds described herein, the interval may be static or dynamic, and may be user-selected or algorithmically determined using any suitable techniques. Creating the entity model 1608 may also include storing the entity model for an entity at a threat management facility for an enterprise network. The entity characterized by the entity model 1608 may be one or more of an identity and access management system, a domain controller, a physical device, a user, an operating system, or an application associated with the enterprise network, or any other entity or combination of entities described herein. In general, the entity model may characterize a baseline of expected events derived from on events detected from the entity over an historical window, and may be expressed, e.g., as a vector in an event vector space or any other suitable representation for making comparisons to new event vectors in the event stream 1604. The threat management facility may store any number and type of entity models, including a plurality of entity models for a plurality of different entity types within the enterprise network. It will be appreciated that the historical window may be manually selected or algorithmically determined, or some combination of these. The historical window may also or instead be static, e.g. selected by an administrator or other user, or the historical window may be dynamic, and may be updated on any suitable schedule, or in response to any of a variety of triggers such as changes in the context of a compute instance or the identification of new threats or risks.

As shown in step 1610, the method 1600 may include receiving additional event vectors, e.g., from instrumented compute instances (as in step 1614 below), or any other suitable source of event vectors in an enterprise network.

As shown in step 1612, the method 1600 may include refining the entity model 1608 based on the additional event vectors in the event stream 1604, such as events received after the entity model 1608 is created. Thus, each entity model 1608 may be periodically updated, e.g., over a rolling window or some other moving or growing interval or the like, to reflect new information on expected behavior or activities. It will be understood that the frequency and nature of updates to the entity model 1608 may depend on information contained in the additional event vectors. Thus, the interval may be static or may be dynamic, and may be algorithmically determined using any suitable techniques. For example, if the additional event vectors remain within expected behavior, and/or if the number of outliers (unexpected behaviors) is small, or the deviations from the baseline are infrequent, temporally clustered, or small in magnitude, then an update to the entity model 1608 may be deferred until meaningful changes in the baseline are apparent. Thus in one aspect, refining the model may include analyzing the nature of deviations from the baseline, and conditionally updating the entity model 1608 when the nature of the deviations indicates a change in the baseline of expected behaviors.

With one or more entity models 1608 created and maintained in this manner, the entity models 1608 may then be applied in a threat management system to detect suspicious or otherwise unusual deviations in the baseline of expected behavior for various entities within an enterprise network.

As shown in step 1614, the method 1600 may include instrumenting a compute instance associated with an entity to report event vectors, e.g., event vectors based on one or more events from one or more sensors associated with the compute instance as generally described herein. This may include deploying sensors at various logical locations within a computing environment using any suitable instrumentation techniques such as hooking, tracing, logging, and the like to monitor computing activity of a compute instance. In addition to deploying sensors to detect various events, instrumentation may include additional processing, e.g., by a local security agent, to enhance the event vectors for efficiency, speed, privacy, security and so forth. Thus, for example, instrumenting the compute instance may include configuring the compute instance to normalize at least one of the events from at least one of the sensors, e.g., to facilitate downstream processing using Euclidean calculations by scaling or otherwise adjusting various event representations in the event feature space. Instrumentation may also or instead include configuring the compute instance to tokenize at least one of the events from at least one of the sensors in order to map literal events into a feature space more suitable for modeling of entity behavior. In another aspect, this may include configuring the compute instance, e.g., through a local security agent, to encrypt at least one of the events from at least one of the sensors. In another aspect, one or more sensors, particularly sensors in critical locations (e.g., the system registry or the kernel space) may be configured to immediately and locally encrypt events prior to reporting to a local security agent for a compute instance. In another aspect, instrumenting the compute instance may include prioritizing at least one of the events from at least one of the sensors, e.g., in order to ensure rapid response to events in critical or highly sensitive memory locations or processes.

As shown in step 1616, the method 1600 may include receiving an event stream 1604 at the threat management facility, the event stream 1604 including a plurality of event vectors from the compute instance. This may be the same event stream 1604 used to create the entity model 1608, or a different event stream 1604, e.g., where entity models are created in one environment, and then deployed in another environment where identical or similar entities are present. It will be understood that the event stream 1604 may more generally include any number and arrangement of events from any number of entities and compute instances such as those described herein. Thus for example, the event stream 1604 may include event vectors from a plurality of compute instances associated with the enterprise network. In another aspect, the event stream 1604 may include event vectors from two or more different entities associated with a compute instance.

As shown in step 1618, the method 1600 may include calculating a risk score for the compute instance based on a comparison of one or more of the event vectors in the event stream with the entity model for the entity. The comparison may use, e.g., a distance in an event vector space between the entity model and one or more event vectors in the event stream. By way of non-limiting examples, calculating the risk score may include calculating a distance between one of the event vectors and the entity model in an event vector space, e.g., where the distance is at least one of a Mahalanobis distance, a Euclidean distance, and a Minkowski distance. In another aspect, the distance may be evaluated using a k-nearest neighbor algorithm. More generally, any suitable measure of distance or similarity, as well as combinations of the foregoing, may usefully be employed to calculate a risk score as contemplated herein.

As shown in step 1620, the method may include responding to the risk score. This may, for example, include selecting a remedial action for the compute instance when the risk score for the entity exceeds a threshold. In this context, the event vectors in the event stream 1604 may provide substantial information about activities on or associated with a compute instance, and the remedial action may be selected in whole or in part based on the event vectors and/or any other contextual information or the like available to the threat management facility.

In another aspect, responding to the risk score may include adjusting a policy for the compute instance based on the risk score. The policy may generally include any security policy or the like for the enterprise network. For example, the policy may include one or more security settings for the compute instance, such as a security setting for at least one of network speed, network communication filtering levels, network data quotas, levels of privilege, and network isolation, any of which may usefully be adjusted in response to a risk score as described herein.

For example, the levels of privilege as described herein may include any delegation of authority to perform security-related functions, such as user permissions to perform various actions. In one aspect, this may include simple levels such as privileged and non-privileged. This may also or instead include multiple privilege levels where supported by a processor architecture, operating system, file system or the like, such as user and supervisor levels for a microprocessor or privileges controlled by an operating system, access control system or the like such as read, write, execute, modify, list contents, etc. It will also be understood that privileges may be hierarchical, and may be defined for one or more users, user groups, and so forth. All such privileges with levels that can be controlled through a policy according to a risk score or the like may usefully be employed as levels of privileges as contemplated herein.

An enterprise network can be monitored using the techniques described above. Where the monitoring identifies risky or unusual behavior, this may result in changes to security settings such as rules, triggers, policies or the like, rather than the specific malware detections typical of an antivirus scanner or the like. In general, the system can continuously evaluate riskiness and change policies based on an objective, empirically-based measurements of expected versus actual activities by a range of entities within the enterprise. As the level of risk is assessed in this manner, the security settings for a security policy such as network speed, filtering levels, network isolation and the like may be correspondingly adjusted for a particular compute instance or the enterprise network as a whole.

In another aspect, there is disclosed herein a system for centralized event detection including a compute instance and a threat management facility in an enterprise network. In general, the compute instance may be configured, e.g., by computer executable code stored in a memory and executing on a processor, to detect one or more events associated with the compute instance and report an event vector including the one or more events to a remote resource. The threat management facility may include a memory storing an entity model characterizing expected events for an entity, and the threat management facility may be configured, e.g., by computer executable code, to receive an event stream including the event vector, to calculate a risk score for the compute instance based on a comparison of the event vector with the entity model, and to select a remedial action for the compute instance based on the event vector when the risk score for the entity exceeds a threshold.

In another aspect, a system for dynamic policy management including a compute instance and a threat management facility in an enterprise network. In general, the compute instance may be configured, e.g., by computer executable code stored in a memory and executing on a processor, to detect one or more events associated with the compute instance and report an event vector including the one or more events to a remote resource. The threat management facility may include a memory storing an entity model characterizing expected events for an entity, and the threat management facility may be configured, e.g., by computer executable code, to receive an event stream including the event vector, to calculate a risk score for the compute instance based on a comparison of the event vector with the entity model, and to adjust a policy for the compute instance based on the risk score.

Figure 17:
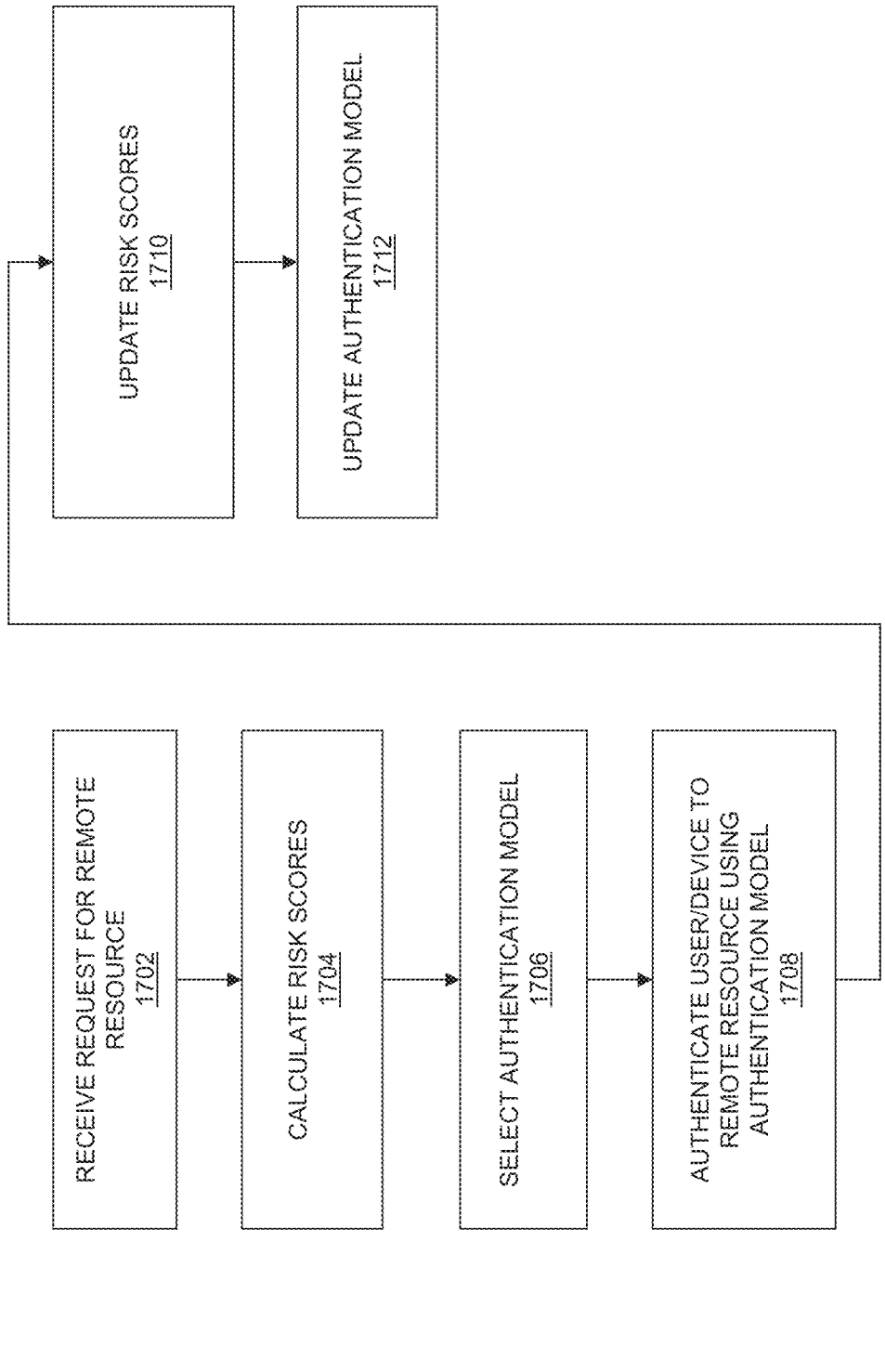
FIG. 17 shows a method for dynamic multi-factor authentication.

FIG. 17 shows a method for dynamic multi-factor authentication. In general, an authentication model can dynamically adjust authentication factors required for access to a remote resource based on changes to a risk score for a user, a device or some combination of these. For example, the authentication model may conditionally specify the number and type of authentication factors required by a user/device pair, and may dynamically alter authentication requirements based on changes to a current risk assessment for the user/device while the remote resource is in use.

As shown in step 1702, the method 1700 may include receiving a request for a remote resource from a compute instance in an enterprise network, such as a request for authenticated access to the remote resource. This may include any resource that might usefully be accessed by a compute instance from within the enterprise network. For example, the remote resource may include a cloud resource outside the enterprise network such as a cloud computing platform, a cloud-based service, a remote software service provider and so forth. The remote resource may be a general cloud computing services such as a remote cloud computing or virtualization platform, or the remote resource may be a special-purpose cloud resource such as cloud-based office productivity tools, customer relationship management tools, or any other software-as-a-service or similar resource or platform, as well as secure databases, communications servers, libraries, media servers, and so forth. As another example, the remote resource may include a domain controller for the enterprise network that responds to security authentication requests within a particular network domain (e.g., within the enterprise or a subnet of the enterprise), or an identity and access management system or the like outside the enterprise network for managing digital identities and related policies. More generally, the remote resource may be any resource inside or outside the enterprise network and remote from the compute instance that requires authentication as a prerequisite to access. In this context, the resource may include any resource that requires authentication as a conditional prerequisite, e.g., where no authentication is required unless a risk score or other risk assessment, context or the like suggests that the user or device requesting access poses a risk, or that security might otherwise benefit from authentication before permitting access and use.

As shown in step 1704, the method 1700 may include calculating risk scores, for example by calculating a first risk score for a user of the compute instance and a second risk score for a device associated with the compute instance. A variety of scoring techniques are useful for assessing risk, and may be adapted for use to provide a user/device-based risk score for dynamic authentication. In one aspect, the entity models described herein provide useful computer-implemented tools for measuring expected behavior and deviations therefrom, and may be usefully employed in this context to calculate risk scores for the particular entities of interest: the user of the compute instance and the device associated with the compute instance. In the context of a physical computing device such as a desktop or laptop, the compute instance may be the device the device that is requesting access to the remote resource. Thus, calculating the first risk score and the second risk score may include calculating risk scores using the entity models and user/device entities described herein. This may include using different entity models at different locations within an enterprise network. For example, the first risk for the user may be based on global information for the user from a threat management facility for the enterprise network, e.g., based on all event vectors for the user, from any devices associated with the enterprise network, and a second risk score for a device associated with the compute instance may be based on a risk assessment for the compute instance by a local security agent executing on the device, which may have information (e.g., in the form of events) that is as current, or potentially more current, than the threat management facility.

It will also be understood that, while event models for a user/device combination can provide a useful measure of riskiness, other measures may also or instead be used, either alone or in combination with such techniques. For example, other risk scores based on, e.g., signatures, context, behavior, machine learning or the like may be used in addition to, or instead of the risk scores described above to dynamically control authentication requirements based on assessed risk. In another aspect, the user risk score based on the entity models described above may be used alone, or a device or compute instance based risk score may be used alone. Thus, for example, in one aspect, the authentication model may be selected based on a reputation of the user retrieved from the threat management facility, along with a vector-based risk score for the compute instance based on an entity model and event vectors as described above. Still more generally, any combination of one or more different types of risk scores and assessments based on one or more different entities (typically but not exclusively, entities associated with an initial resource request) may be used to select an authentication model as contemplated herein without departing from the scope of this disclosure.

As shown in step 1706, the method 1700 may include selecting an authentication model for access to the remote resource by the user and the device, e.g., by selecting an authentication model from a number of authentication models for access to the remote resource. In general, the authentication model may specify one or more requirements for authentication to the remote resource. One suitable factor for the authentication model is a user name and password. Other useful authentication factors for the authentication model may include a biometric authentication factor, a challenge-response test, and so forth. For example, in one aspect, all of the authentication models include a user name and a password, and at least one of the authentication models including at least one other authentication factor. The at least one other authentication factor may, for example, include one or more of a biometric identifier, a security token (or code from a security token), a challenge-response test (e.g., a captcha challenge-response test, a security question challenge-response test, etc.), a one-time-use passcode sent by text, electronic mail, telephone call, or other communication medium, or some combination of these. In one aspect, the authentication models may provide a progressive series of authentication requirements that increases in the number or relative security of authentication factors in order to facilitate scaling of the authentication requirements to the assessed risk.

More generally, the authentication models may provide various sets of authentication requirements using various combinations of the foregoing authentication factors or any other authentication factors, with the particular authentication factors varying based on the user and device risk scores. In general, the authentication factors may include anything that a user knows (e.g., a password or the like), anything that the user has (a security token, mobile device, email address, etc.), or an inherent property of the user (e.g., a biometric identifier, GPS location). The risk scores may also generally be used as an authentication factor, e.g., by using the risk score as a property of the user and requiring a minimum or maximum value, or indirectly by using the risk score as a threshold for whether to select an authentication model requiring one or more additional authentication factors. In this context, it will be understood that the authentication model selection may depend on the magnitude of the risk score(s), which may be combined in a weighted or unweighted manner, and/or applied independently from one another in order to generally assess the risk of a particular user/device pair and select a suitable authentication model. For example, where the user entity model indicates significant risk for the user, an authentication model may be selected that requires an additional authentication factor for that user such as a token or a biometric identifier. On the other hand, where the device entity model indicates significant risk for the device, an authentication model may be selected that requires an additional authentication factor for the device such as a heartbeat or hardware authentication.

The risk scores may be used directly by the remote resource, or by some intermediary such as the threat management facility for an enterprise network, or a third party authentication resource. Thus for example, a remote resource may request a risk score for the user and/or device, e.g., from a threat management facility for an enterprise network associated with the user. These scores may also be provided directly by the device, although in such embodiment the scores will preferably be signed or otherwise independently verified/verifiable, e.g., using a Trusted Platform Module or other hardware authentication system or the like in order to prevent falsification by the device or user providing the risk score.

Further, selecting the authentication model may include selecting an authentication model that conditionally uses an additional authentication factor. For example, if the risk score for the device or the user (or some combination of these) is below a threshold such that it indicates that the user and device are safe, then the authentication model may use an additional authentication factor. Conversely, if the risk score for the device or the user is above the threshold such that it indicates that the user or the device is compromised or unsafe, then the authentication model may withhold the additional authentication factor to prevent access by the device to the remote resource. Other conditional configurations may also or instead be employed. For example, in one embodiment, if the risk score for the device or the user (or some combination of these) is below a threshold such that it indicates that the user and device are safe, then the authentication model may forego an additional authentication factor. Conversely, if the risk score for the device or the user is above the threshold such that it indicates that the user or the device is compromised or unsafe, then the authentication model may require the additional authentication factor as a condition for access by the device to the remote resource.

The authentication model, once selected, may be applied by one or more resources within the network. That is, in addition to specifying various authentication factors, an authentication model may specify a resource responsible for administering or providing any of the authentication factors. For example, in one aspect, one or more of the authentication factors required by the authentication model, such as a username and password, may be applied by the remote resource. In another aspect, one or more of the authentication factors required by the authentication model may be applied by a threat management facility, e.g., based on resources used to manage an identity of the user and device within an enterprise network. The one or more authentication factors may also or instead be applied by a third party authentication platform. Thus for example, where a remote resource receives a permissible risk score for the user and/or device as described above, the remote resource may request a onetime passcode that is sent from a third party authentication platform, which may either independently authenticate the user or device and respond securely to the remote resource, or may use another authentication factor or the like (e.g., a cellphone number or electronic mail address associated with a user) to provide a passcode to the user, which the user can in turn provide directly to the remote resource.

According to the foregoing, in one aspect, selecting the authentication model includes selecting a model that uses an additional authentication factor to permit access when at least one of the first risk score and the second risk score is below a threshold and withholds the additional authentication factor to prevent access when at least one of the first risk score and the second risk score is above a threshold. In another aspect, the authentication model may conditionally require the additional authentication factor when the risk score is above a safe level. Thus for example, in another aspect, selecting the authentication model may include selecting a model that does not require an additional authentication factor to permit access when at least one of the first risk score and the second risk score is below a threshold and requires the additional authentication factor to permit access to the remote resource when at least one of the first risk score and the second risk score is above a threshold. More generally the authentication models may use any number, type, and arrangement of secondary authentication techniques to manage additional authentication factors including techniques administered by the remote resource or techniques administered by other independent, third party authentication administration platforms such as the Duo Multi-Factor authentication system provided by Cisco Systems, Inc.

Other secondary techniques may also or instead be used to support authentication models or provide additional authentication factors. For example, a secondary authentication may be based on information such as whether a user recently logged in to the device, whether a user recently provided a token passcode (e.g., within the last day or the last week), whether the device recently connected to the enterprise network, the current IP address for a device, the geolocation of a device, or whether the user/device combination recently logged in to the remote resource.

As shown in step 1708, the method 1700 may include authenticating the user to the remote resource according to the authentication model selected in step 1706. The authentication model may be deployed in various locations within or outside the enterprise network. For example, in one aspect, the authentication model may be applied by the threat management facility for the enterprise network, or through a local security agent for the compute instance, either independently or under control of the threat management facility. In another aspect, the authentication model may be forwarded to the remote resource for use by the remote resource in authenticating the user/device. In this manner, security items such as biometric authentication, tokens, challenge questions and the like may be locally managed by various remote resources while the need for such additional authentication factors, e.g., whether a particular authentication factor is required in a particular context, may be managed by the threat management facility using a suite of authentication models that are deployed in response to an assessed risk.

As shown in step 1710, the method 1700 may include, after authentication according to the authentication model, updating the first risk score and the second risk score, e.g., using any of the techniques described herein.

As shown in step 1712, the method 1700 may include updating the authentication model based on the updated risk scores. Based on the updated authentication model, the user's current authentication may or may not continue to be valid. Thus for example, when at least one of the first risk score and the second risk score increases such that it exceeds a threshold, the method may include deauthenticating the user and selecting a new authentication model for the user and the device based on the new risk scores. In this manner, the authentication requirements for a particular user/device may be dynamically regulated according to a changing assessment of risk based on whether and to what extent these entities are deviating from a baseline of expected behavior.

In another aspect, a system described herein includes a compute instance on an enterprise network, a remote resource accessible to the compute instance, a memory storing a plurality of authentication models, each of the plurality of authentication models specifying a number of authentication models each containing authentication factors for use when a user accesses the remote resource from the compute instance, and a threat management facility. The threat management facility may be configured, e.g., by computer executable code, to assess a risk of the compute instance and the user, to select one of the plurality of authentication models from the memory for use in authenticating the user of the compute instance to the remote resource based on the risk, and to control authentication of the user to the remote resources with the compute instance based on the one of the plurality of authentication models.

FIG. 18 shows a method for operating a network security marketplace. In general, an interface for a threat management facility of an enterprise network supports the use of third-party security products within the enterprise network by providing access to relevant internal instrumentation and/or a programmatic interface for direct or indirect access to local security agents on compute instances within the enterprise network. This method 1800 may be used, for example, in the context of the marketplace and corresponding interfaces described in FIG. 7 above.

As shown in step 1802, the method 1800 may begin with providing programmatic interfaces to a threat management facility or other platform or the like to facilitate provisioning of security services and related information between an enterprise network and remote services operating outside the enterprise network, e.g., accessible by and to remote services through a gateway or the like for the enterprise network. This may, for example, including providing a first interface of the threat management facility for monitoring activity on a plurality of compute instances associated with the enterprise network. This may also or instead include providing a second interface of the threat management facility for communications with local security agents on the compute instances that provide local security to the compute instances against malicious network activity. This may also or instead include providing a third interface of the threat management facility providing programmatic access to the threat management facility by one or more resources outside the enterprise network. The interfaces may be coupled and coordinated by a security system associated with the threat management facility for use of third party security resources within the enterprise network. The security system may be configured to controllably expose data available through the first interface to a remote user accessing the threat management facility through the third interface, and to controllably expose configuration of the local security agents accessible through the second interface to the remote user through the third interface. In this manner, remote resource may enjoy monitored and regulated access to endpoints within the enterprise network, and the endpoints may in complementary fashion enjoy monitored and regulated access to external services to enhance security and so forth.

The remote user may, for example, include a cloud service such as a cloud computing platform, a cloud storage facility, a third party identity and access management system, a third party security service provider, a trust authority, and so forth. In one aspect, the cloud service may include a human resources provider for the enterprise network, which may benefit from up to date information on, e.g., new hires, terminated employees, and other changes in status, and may similarly benefit from increased security against risks of exposing potentially sensitive information of an enterprise and the like. Thus for example, where an employee is terminated, this information may usefully be obtained from the remote human resources provider and used to determine whether and how to increase monitoring of a related user, e.g., to protect against data exfiltration or other malicious or potentially harmful activity.

In one aspect, the threat management facility may include an authentication facility for controlling access to the enterprise network by the remote user, such as a multifactor authentication facility requiring two or more factors for authentication of the remote user, or a dynamic authentication system such as that described herein. The threat management facility may also include a metering facility, e.g., that supports payments by the remote user to the threat management facility for access to the enterprise network. The metering facility may also or instead support payments by the threat management facility to the remote user for access to services of a remote resource of the remote user by the compute instances associated with the enterprise network, or otherwise support metering and payment for third party services rendered through or coordinated by the threat management facility. In another aspect, the threat management facility may include an event collection facility accessible to the remote user through the third interface, such as any of the event collection systems described herein, or any other platform for logging events and information relevant to the deployment and use of third party services through the threat management facility.

As shown in step 1804, the method 1800 may include monitoring activity on a plurality of compute instances associated with an enterprise network through a first interface of a threat management facility, e.g., to collect events as described herein or otherwise monitor computing activity. Thus in one aspect, the method 1800 may include storing an event stream for the enterprise network at an event collection facility of the threat management facility as described herein. This method 1800 may also or instead include providing access to the event collection facility for remote resources through the third interface (for remote access), e.g., in order to facilitate improved delivery of security services from outside vendors based on the event stream.

As shown in step 1806, the method 1800 may include communicating with local security agents on the compute instances through a second interface of the threat management facility, e.g., to deploy security measures or otherwise coordinate security policies and the like within the enterprise network, such as by delivering patches, dictionary updates, and remediations to compute instances from remote providers of security services.

As shown in step 1808, the method 1800 may include operating a security system on the threat management facility using the interfaces as described above. For example, the security system may be configured to controllably expose data available through the first interface to a remote user accessing the threat management facility through the third interface, and the security system further configured to controllably expose configuration of the local security agents accessible through the second interface to the remote user through the third interface.

As shown in step 1810, the method 1800 may include controlling access to the enterprise network by the remote user through an authentication facility of the threat management facility. The authentication facility may, for example, be a multifactor authentication facility requiring two or more factors for authentication of the remote user. The authentication facility may also or instead use the dynamic authentication system described herein to adjust the type of authentication required for users and devices based on perceived risk.

As shown in step 1812, the method 1800 may include charging for services provided through the first interface, the second interface, and the third interface of the threat management facility with a metering facility of the threat management facility. For example, the metering facility may support payments by the remote user to the threat management facility for access to the enterprise network. The metering facility may also or instead support other payment transactions, such as payments by the threat management facility to the remote user for access to services of a remote resource of the remote user by the compute instances associated with the enterprise network. Thus, for example, where a compute instance purchases a security service, either for remote monitoring or local installation, the purchase may be transacted through the metering facility of the threat management facility. More generally, any financial transactions, data transactions or the like, may be metered and charged or paid for through the metering facility.

According to the foregoing, in one aspect there is disclosed herein a system for interfacing an enterprise network with remote, third party services. The system may include a threat management facility for compute instances in an enterprise network, a first interface of the threat management facility for monitoring activity on the compute instances, a second interface of the threat management facility for communications with local security agents on the compute instances that provide local security to the compute instances against malicious network activity, a third interface of the threat management facility providing programmatic access to the threat management facility by one or more resources outside the enterprise network, and a security system within the threat management facility. The security system may be configured to controllably expose data available through the first interface to a remote user accessing the threat management facility through the third interface, and the security system further configured to controllably expose configuration of the local security agents accessible through the second interface to the remote user through the third interface.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on one or more computing devices, performs the steps of:
  receiving a request for a remote resource from a compute instance in an enterprise network, the remote resource requiring authentication;
  calculating a risk score for the compute instance based on a risk assessment for the compute instance by a local security agent executing on the compute instance;

selecting an authentication model from a number of authentication models for the remote resource, the authentication model specifying one or more requirements for authentication to the remote resource, wherein selecting the authentication model is dependent on the risk score for the compute instance;

authenticating the request by the compute instance for the remote resource to establish an authenticated session according to the authentication model;

updating the risk score for the compute instance; and based on the updated risk score for the compute instance, deauthenticating the authenticated session and selecting a new authentication model from the number of authentication models for the remote resource.

2. The computer program product of claim 1, wherein selecting the authentication model is based on a user of the compute instance associated with the request.

3. The computer program product of claim 1, wherein selecting the authentication model is based on a risk score for a user of the compute instance associated with the request.

4. The computer program product of claim 1, wherein one or more of deauthenticating the authenticated session and selecting the new authentication model is based on the updated risk score exceeding a threshold.

5. The computer program product of claim 4, wherein the threshold is algorithmically determined.

6. The computer program product of claim 1, wherein one or more of deauthenticating the authenticated session and selecting the new authentication model is based on the updated risk score varying from the risk score by more than a threshold value.

7. The computer program product of claim 6, wherein the threshold value is algorithmically determined.

8. The computer program product of claim 1, further comprising computer executable code that, when executing, performs the step of authenticating the request by the compute instance for the remote resource according to the new authentication model.

9. The computer program product of claim 1, wherein the one or more requirements for authentication includes one or more of a biometric identifier, a security token, and a challenge-response test.

10. The computer program product of claim 1, wherein the one or more requirements for authentication includes a captcha challenge-response test.

11. The computer program product of claim 1, wherein the one or more requirements for authentication includes a one-time-use passcode.

12. The computer program product of claim 1, wherein the remote resource includes a domain controller for the enterprise network.

13. The computer program product of claim 1, wherein the remote resource includes a cloud resource outside the enterprise network.

14. The computer program product of claim 1, wherein the remote resource includes an identity and access management system.

15. The computer program product of claim 1, wherein the authentication model is applied by a threat management facility for the enterprise network.

16. The computer program product of claim 1, wherein the authentication model is applied by the remote resource.

17. A method, comprising:

receiving a request for a remote resource from a compute instance in an enterprise network, the remote resource requiring authentication;

calculating a risk score for the compute instance based on a risk assessment for the compute instance by a local security agent executing on the compute instance;

selecting an authentication model from a number of authentication models for the remote resource, the authentication model specifying one or more requirements for authentication to the remote resource, wherein selecting the authentication model is dependent on the risk score for the compute instance;

authenticating the request by the compute instance for the remote resource to establish an authenticated session according to the authentication model;

calculating an updated risk score for the compute instance;

selecting a second authentication model from the number of authentication models based on the updated risk score; and updating authentication of the authenticated session according to the second authentication model.

18. The method of claim 17, wherein selecting the authentication model is based on a risk score for a user of the compute instance associated with the request.

19. The method of claim 17, wherein selecting the second authentication model includes selecting the second authentication model when the updated risk score varies from the risk score by more than a threshold value.

20. A system, comprising:

a compute instance on an enterprise network;

a remote resource accessible to the compute instance;

a memory storing a plurality of authentication models, the plurality of authentication models specifying one or more requirements for controlling authentication to the remote resource; and a threat management facility configured to access a risk score for the compute instance, to select one of the plurality of authentication models from the memory for use in authenticating a request by the compute instance for the remote resource based on the risk score for the compute instance, and to control authentication of the request for the remote resource based on the one of the plurality of authentication models, wherein authentication includes updating the risk score for the compute instance, and when the updated risk score for the compute instance exceeds a threshold, selecting a new authentication model from the memory and updating the authentication according to the new authentication model.

* * * * *